(12) United States Patent
Hirata

(10) Patent No.: US 8,717,672 B2
(45) Date of Patent: May 6, 2014

(54) VARIABLE-FOCUS OPTICAL SYSTEM

(75) Inventor: Tadashi Hirata, Tokyo (JP)

(73) Assignee: Olympus Corporation, Tokyo (JP)

( * ) Notice: Subject to any disclaimer, the term of this patent is extended or adjusted under 35 U.S.C. 154(b) by 219 days.

(21) Appl. No.: 13/417,814

(22) Filed: Mar. 12, 2012

(65) Prior Publication Data

US 2012/0236399 A1  Sep. 20, 2012

(30) Foreign Application Priority Data

Mar. 18, 2011 (JP) ................................. 2011-061319

(51) Int. Cl.
  *G02B 21/02* (2006.01)
(52) U.S. Cl.
  USPC .......................................................... 359/379
(58) Field of Classification Search
  USPC .................... 359/379, 380, 656–661
  See application file for complete search history.

(56) References Cited

U.S. PATENT DOCUMENTS

| 6,181,480 | B1 * | 1/2001 | Ito ................................. 359/656 |
| 7,215,478 | B1 * | 5/2007 | Hirata ........................... 359/656 |
| 7,889,432 | B2 * | 2/2011 | Watanabe et al. ............. 359/656 |

FOREIGN PATENT DOCUMENTS

JP   2009-069689   4/2009

* cited by examiner

*Primary Examiner* — Frank Font
(74) *Attorney, Agent, or Firm* — Scully, Scott, Murphy & Presser, P.C.

(57) ABSTRACT

Aberrations are sufficiently corrected, and an excellent image is acquired. Provided is a variable-focus optical system including a positive-power front-group optical system, a rear-group optical system having the same power, and an optical-system driving unit configured to relatively change the distance therebetween in the optical axis direction, wherein the front-group optical system consists of a positive-power first-group optical system formed of a joined lens, that is, a lens L1 and a lens L2, a positive-power second-group optical system consisting of a lens L3, and a third-group optical system formed of a lens L4 and a lens L5, and the rear-group optical system consists of a positive-power fourth-group optical system formed of a lens L7 and a lens L6, a fifth-group optical system consisting of a positive-power lens L8, and a positive-power sixth-group optical system formed of a joined lens, that is, a lens L10 and a lens L9.

5 Claims, 29 Drawing Sheets

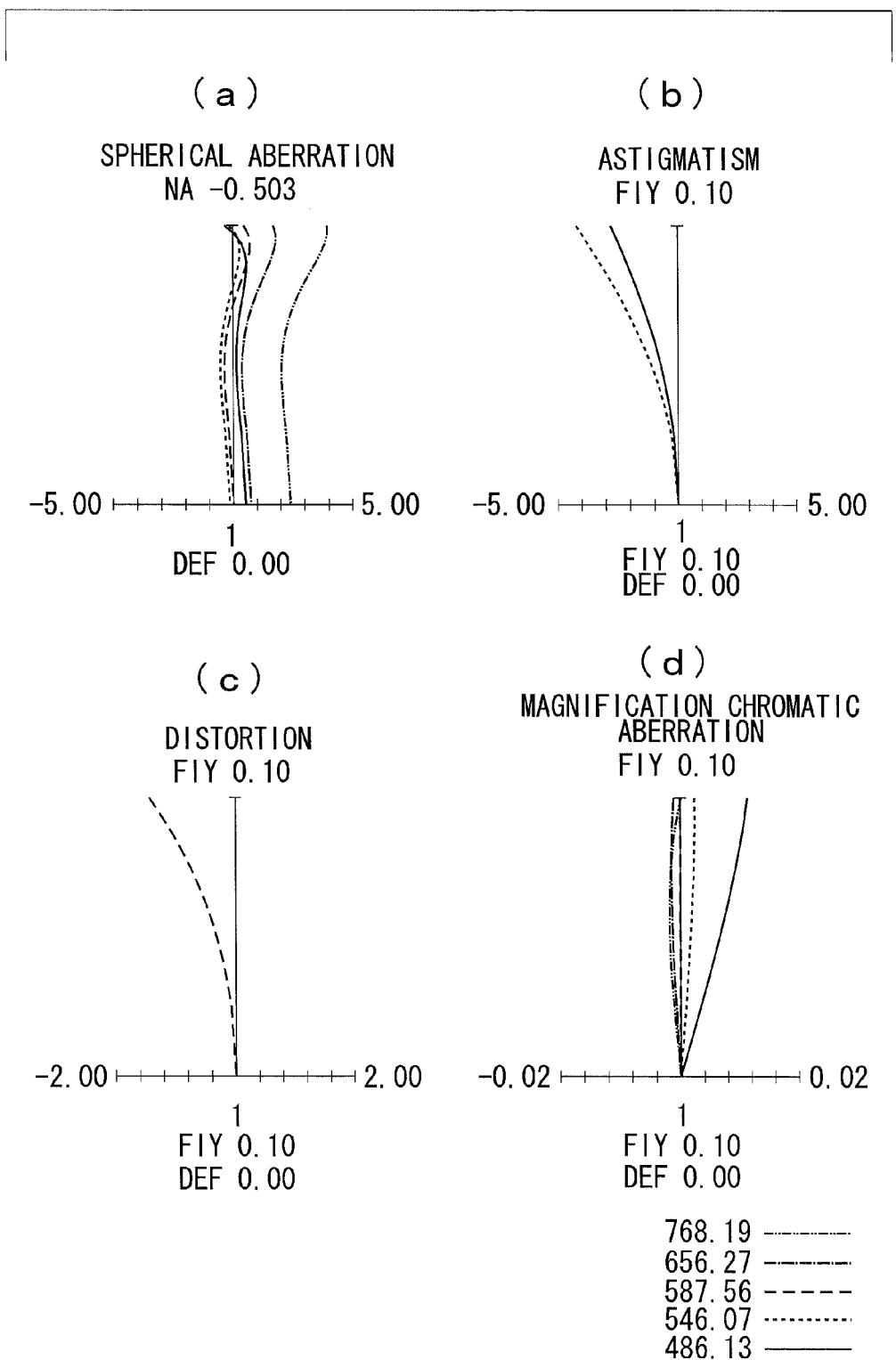

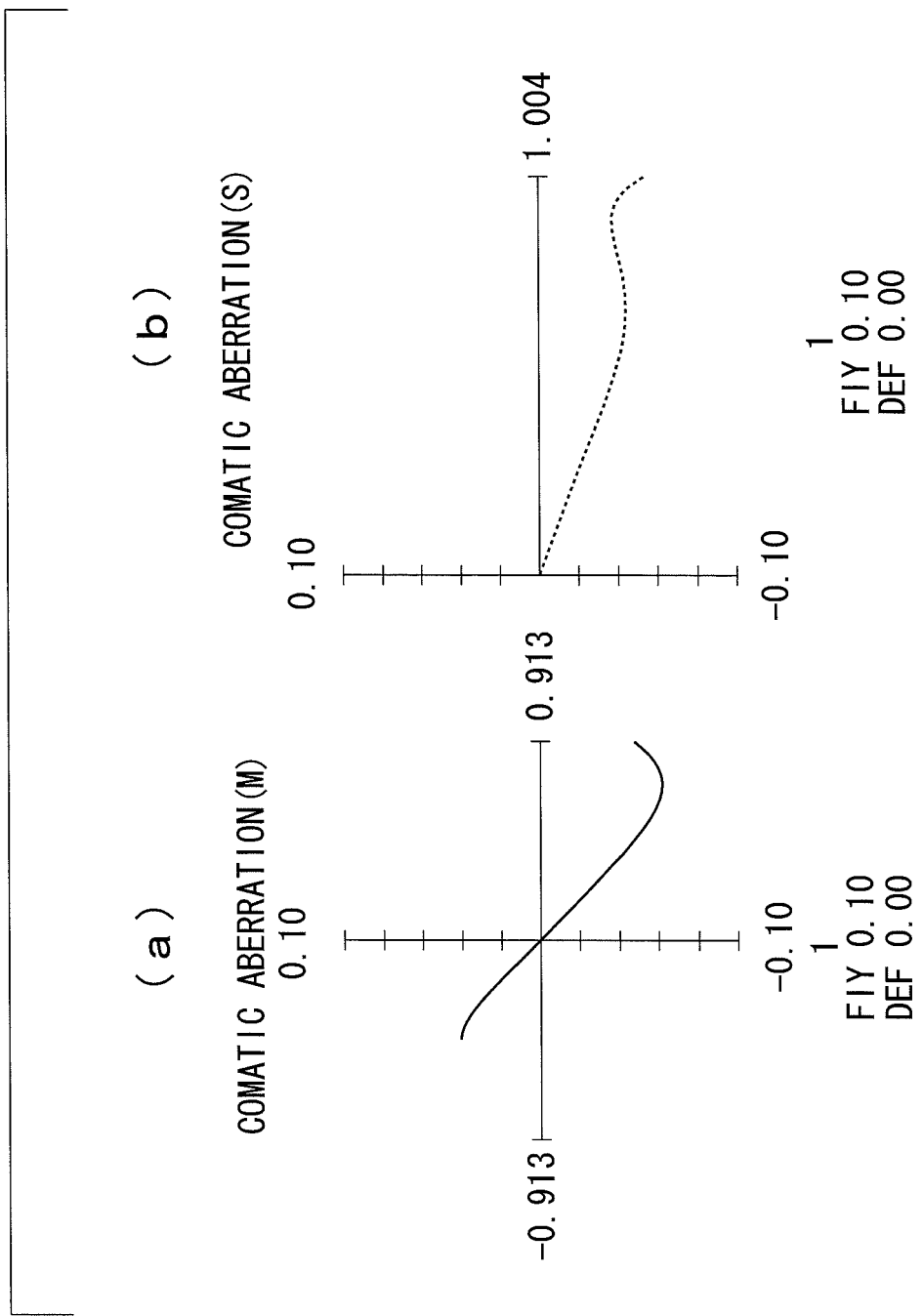

VARIABLE-FOCUS OPTICAL SYSTEM

TECHNICAL FIELD

This application is based on Japanese Patent Application No. 2011-061319, the contents of which are incorporated herein by reference.

The present invention relates to a variable-focus optical system.

BACKGROUND ART

Conventionally, a variable-focus optical system that is disposed between an objective lens and an imaging lens in a microscope apparatus and that varies the working distance of the objective lens has been known (for example, refer to PTL 1). The variable-focus optical system described in PTL 1 includes a front-group optical system disposed on the objective lens side and a rear-group optical system disposed on the imaging lens side, wherein, by disposing the front focus of the front-group optical system near the rear focus of the objective lens and driving at least one of the front-group optical system and the rear-group optical system in the optical axis direction, variations in the observation magnification can be suppressed while allowing the working distance of the objective lens to be changed.

CITATION LIST

Patent Literature

{PTL 1}
Japanese Unexamined Patent Application, Publication No. 2009-69689

SUMMARY OF INVENTION

Technical Problem

However, PTL 1 describes a concept and simplifies the front-group optical system and the rear-group optical system into single lenses. When a variable-focus optical system is to be realized with single lenses as described in PTL 1, there is a problem in that excellent image quality cannot be achieved due to the influence of aberrations.

The present invention has been conceived in light of such circumstances, and an object thereof is to provide a variable-focus optical system that can sufficiently correct aberrations and acquire an excellent image.

Solution to Problem

To solve the above-described problem, the present invention employs the following solutions.

An aspect of the present invention is a variable-focus optical system that is used in a microscope system including an objective optical system configured to convert light coming from a specimen to a substantially collimated beam and an imaging optical system configured to image, at a predetermined position, the light converted to the substantially collimated beam by the objective optical system, that is disposed between the objective optical system and the imaging optical system, and that varies a working distance of the objective optical system, the variable-focus optical system including a front-group optical system having positive power on the whole and a rear-group optical system having positive power substantially the same as that of the front-group optical system on the whole, the optical systems being disposed in this order from the objective optical system side, an optical-system driving unit configured to drive at least one of the front-group optical system and the rear-group optical system in an optical axis direction to relatively change the distance between the front-group optical system and the rear-group optical system in the optical axis direction, wherein the front-group optical system consists of, in order from the objective optical system side, a first-group optical system having positive power on the whole, a second-group optical system having positive power on the whole, and a third-group optical system, the first-group optical system consists of a single joined lens formed by joining, at a joining surface having negative power, a lens made of a low-dispersion material with a small refractive index and a lens made of a high-dispersion material with a large refractive index, the second-group optical system consists of a positive-power lens disposed closest to the objective optical system such that a convex surface faces the objective optical system, the third-group optical system consists of two lenses, of which the lens disposed closest to the objective optical system has a concave surface facing the objective optical system, the rear-group optical system consists of, in order from the objective optical system side, a fourth-group optical system having positive power on the whole, a fifth-group optical system, and a sixth-group optical system having positive power on the whole, the fourth-group optical system consists of, in this order from the objective optical system side, two lenses, that is, a positive-power lens and a negative-power lens disposed such that the negative-power lens disposed closest to the imaging optical system has a concave surface facing the imaging optical system, the fifth-group optical system consists of a positive-power lens disposed closest to the imaging optical system such that a convex surface facing the imaging optical system, and the sixth-group optical system consists of a single joined lens formed by joining, at a joining surface having negative power, a lens made of a low-dispersion material and a lens made of a high-dispersion material.

According to the aspect of the present invention described above, the light coming from the specimen and converted to the substantially collimated beam by the objective optical system diverges after being imaged by the positive-power front-group optical system, is converted to a substantially collimated beam by the positive-power rear-group optical system, and is imaged at the image plane by the imaging optical system.

When the front-group optical system and the rear-group optical system are in an afocal optical system relationship, light forms substantially collimated beams between the objective optical system and the front-group optical system and between the rear-group optical system and the imaging optical system. When the front-group optical system and the rear-group optical system are displaced from an afocal optical system relationship, the light between the objective optical system and the front-group optical system is displaced from a substantially collimated beam, becoming diverged or converged. As a result, the working distance of the objective optical system changes. Thus, by driving at least one of the front-group optical system and the rear-group optical system in the optical axis direction with the optical-system driving unit, the working distance of the objective optical system can be changed.

In such a case, since the power of the rear-group optical system and the power of the front-group optical system are substantially the same, the light coming from the specimen can be relayed from the objective optical system to the imaging optical system without changing the absolute value of the magnification of the objective optical system. The axial chromatic aberration can be corrected by the joining surface of the joined lens in the first-group optical system. The light coming from the objective optical system is converged by the positive-power lens of the second-group optical system disposed closest to the objective optical system. By having the convex surface of this lens facing toward the objective optical system, the generation of spherical aberration can be reduced. The spherical aberration generated by the second-group optical system can be corrected by the concave surface of the lens of the third-group optical system disposed closest to the objective optical system. The concave surface can correct field curvature and comatic aberration. The concave surface of the negative-power lens of the fourth-group optical system disposed closest to the imaging optical system can correct the spherical aberration generated by the fifth-group optical system. The concave surface can correct the field curvature and the comatic aberration. The light converged/diverged by the front-group optical system is restored to a collimated beam by the positive-power lens of the fifth-group optical system. By having the convex surface of this lens face toward the imaging optical system, the generation of spherical aberration can be reduced. The joining surface of the joined lens in the sixth-group optical system can correct the axial chromatic aberration. As described above, aberrations can be sufficiently corrected, and an excellent image can be acquired.

In the above-described aspect, the following Conditional Expressions (1) to (6) may be satisfied:

$$35 < v_{1L} - v_{1H} < 60 \tag{1}$$

$$0.6 < |F2/Fa| < 0.9 \tag{2}$$

$$0.1 < |R_{G3}/Fa| < 0.3 \tag{3}$$

$$0.1 < |R_{G4}/Fb| < 0.2 \tag{4}$$

$$0.9 < |F5/Fb| < 1.2 \tag{5}$$

$$40 < v_{6L} - v_{6H} < 60 \tag{6}$$

where $v_{1L}$ represents the d-line Abbe number of the lens of the joined lens in the first-group optical system made of a low-dispersion material with a small refractive index, $v_{1H}$ represents the d-line Abbe number of the lens of the joined lens in the first-group optical system made of a high-dispersion material with a large refractive index, Fa represents the focal length of the entire front-group optical system, Fb represents the focal length of the entire rear-group optical system, F2 represents the focal length of the second-group optical system, $R_{G3}$ represents the radius of curvature of the concave surface of the lens disposed closest to the objective optical system in the third-group optical system, $R_{G4}$ represents the radius of curvature of the concave surface of the negative-power lens disposed closest to the imaging optical system in the fourth-group optical system, F5 represents the focal length of the fifth-group optical system, $v_{6L}$ represents the d-line Abbe number of the lens of the joined lens in the sixth-group optical system made of a low-dispersion material with a small refractive index, and $v_{6H}$ represents the d-line Abbe number of the lens of the joined lens in the sixth-group optical system made of a high-dispersion material with a large refractive index.

If the first-group optical system falls below the lower limit of Conditional Expression (1), the axial chromatic aberration becomes too large. In contrast, there are almost no lens materials that exceed the upper limit of Conditional Expression (1).

If the second-group optical system falls below the lower limit of Conditional Expression (2), the spherical aberration becomes too large. In contrast, if the upper limit of Conditional Expression (2) is exceeded, light will not be sufficiently converged.

If the third-group optical system falls below the lower limit of Conditional Expression (3), comatic aberration is overcorrected. In contrast, if the upper limit of Conditional Expression (3) is exceeded, the spherical aberration, the field curvature, and the comatic aberration are corrected insufficiently.

If the fourth-group optical system falls below the lower limit of Conditional Expression (4), the comatic aberration is overcorrected. In contrast, if the upper limit of Conditional Expression (4) is exceeded, the spherical aberration, the field curvature, and the comatic aberration are corrected insufficiently.

If the fifth-group optical system falls below the lower limit of Conditional Expression (5), the spherical aberration become too large. In contrast, if the upper limit of Conditional Expression (5) is exceeded, the light cannot be restored to a collimated beam.

If the sixth-group optical system falls below the lower limit of Conditional Expression (6), the axial chromatic aberration becomes too large. In contrast, there are almost no lens materials that exceed the upper limit of Conditional Expression (6).

In the above-described aspect, the value of the front focus position of the front-group optical system and the value of the rear focus position of the rear-group optical system may both be negative.

In a typical microscope apparatus, since the back focal distance of the objective optical system (equivalent to the pupil position when the object side is a telecentric optical system) is a negative value, the front focus of the front-group optical system can be disposed close to the back focus of the objective optical system by setting the front focal distance of the front-group optical system to a negative value. In this way, the change in the magnification when the working distance of the objective optical system is changed can be suppressed. By setting the back focal distance of the rear-group optical system to a negative value, the total length when combined with the imaging optical system can be decreased.

In the above-described aspect, the following Conditional Expressions (7) and (8) may be satisfied:

$$-1.8 < Fa/F3 < 0.2 \tag{7}$$

$$1.5 < Fb/F4 < 2.2 \tag{8}$$

where F3 represents the focal length of the third-group optical system, and F4 represents the focal length of the fourth-group optical system.

To dispose the front focus of the front-group optical system close to the back focus of the objective optical system, preferably, the power of the third-group optical system is decreased or set to a negative value. When the front focal distance of the front-group optical system is set to a negative value, comatic aberration becomes too large when the value falls below the lower limit of Conditional Expression (7). In contrast, when the upper limit of Conditional Expression (7) is exceeded, the front focal distance of the front-group optical system cannot be set to a negative value.

When the back focal distance of the rear-group optical system is set to a negative value, the back focal distance of the rear-group optical system will not be a negative value if the value falls below the lower limit of Conditional Expression (8). In contrast, if the upper limit of Conditional Expression (8) is exceeded, the comatic aberration becomes large.

In the above-described aspect, the following Conditional Expression (9) may be satisfied:

$$0.1 < Fa/Ft1 < 0.2 \quad (9)$$

where Ft1 represents the focal length of the imaging optical system.

Conditional Expression (9) is a condition for satisfactorily correcting aberrations without increasing the total length. If the value falls below the lower limit of Conditional Expression (9), the NA of a beam between the front-group optical system and the rear-group optical system becomes too large, making various types of aberration correction difficult. In contrast, if the value exceeds the upper limit of Conditional Expression (9), the total length becomes too large.

Advantageous Effects of Invention

The present invention is advantageous in that aberrations can be sufficiently corrected, and an excellent image can be acquired.

BRIEF DESCRIPTION OF DRAWINGS

FIG. 28(a) illustrates the spherical aberration of a microscope system when a front-group optical system and a rear-group optical system of the variable-focus optical system in FIG. 27 are in an afocal optical system relationship; FIG. 28(b) illustrates astigmatism of the same; FIG. 28(c) illustrates distortion of the same; and FIG. 28(d) illustrates magnification chromatic aberration of the same.

FIG. 29(a) illustrates the comatic aberration (M) of a microscope system when a front-group optical system and a rear-group optical system of the variable-focus optical system in FIG. 27 are in an afocal optical system relationship, and FIG. 29(b) illustrates the comatic aberration (S) of the same.

DESCRIPTION OF EMBODIMENTS

A variable-focus optical system 4 according to an embodiment of the present invention will be described below with reference to the drawings.

Figure 1:
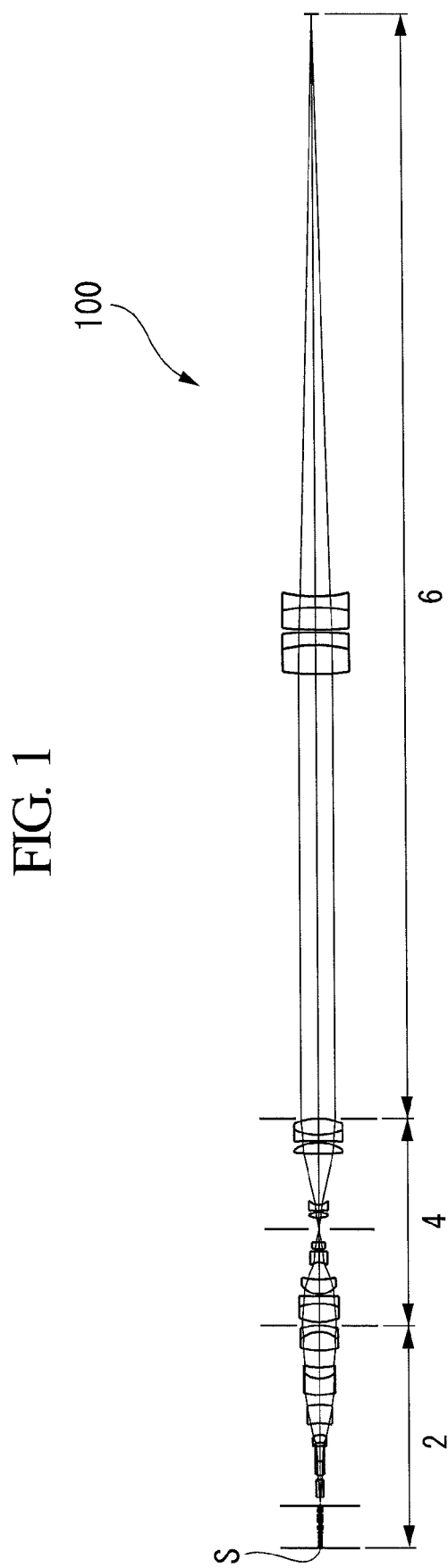
FIG. 1 is a sectional view of a microscope system including a variable-focus optical system according to an embodiment of the present invention.

As illustrated in FIG. 1, the variable-focus optical system 4 according to this embodiment can be employed in a microscope system 100 including an objective optical system 2 that converts light coming from a specimen S irradiated with illumination light to a substantially collimated beam and an imaging optical system 6 that images at a predetermined position with the light converted to the substantially collimated beam by the objective optical system 2. The variable-focus optical system 4 is disposed between the objective optical system 2 and the imaging optical system 6. For example, in FIG. 1, the distance between the objective optical system 2 and the variable-focus optical system 4 is 1 mm, and the distance between the variable-focus optical system 4 and the imaging optical system 6 is 120 mm.

Figure 2:
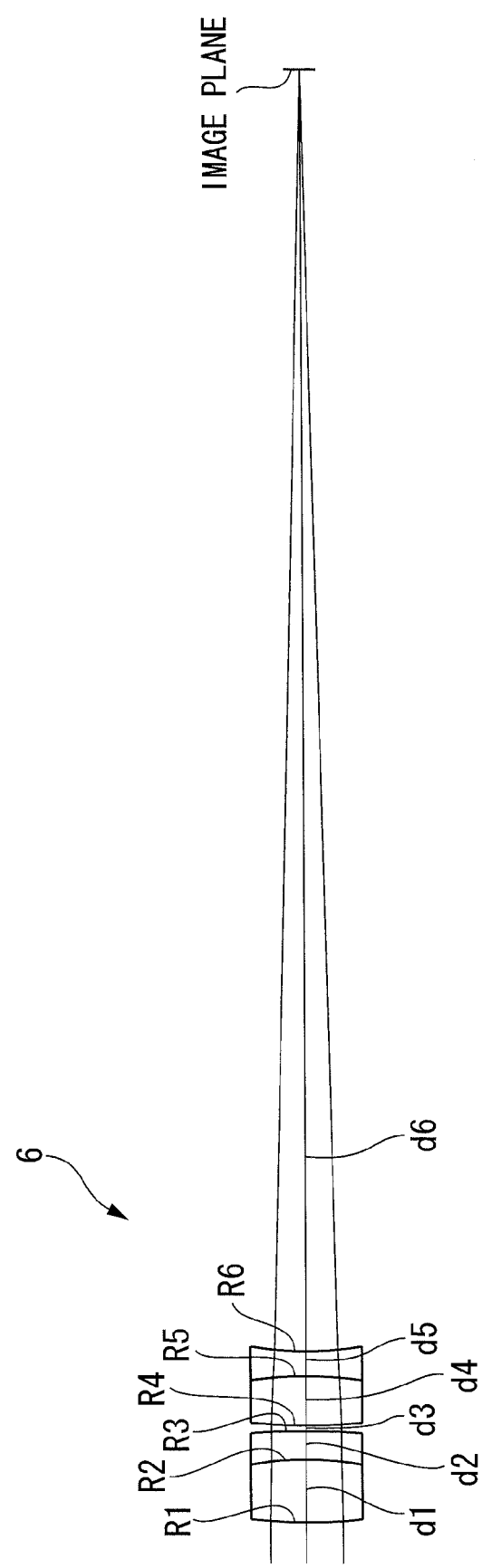
FIG. 2 is a sectional view of the imaging optical system in FIG. 1.

In the embodiments described below, the objective optical system 2 is an infinity correction type objective lens whose light emitted to the image side is a collimated beam and does not image. Thus, it is used in combination with, for example, an imaging optical system (focal length 180 mm, front focus position −192.01 mm, and rear focus position 157.044 mm) 4 having the lens data listed in Table 1 below and having the lens cross-section illustrated in FIG. 2. In FIGS. 2 to 27, reference sign Rs represents the curved surface of a surface number s, and reference sign ds represents the inter-surface distance of the surface number s.

TABLE 1

| S | R | d | nd | v |
|---|---|---|---|---|
| Last surface of variable-focus optical system | | 120 | | |
| 1 | 68.7541 | 7.7321 | 1.48749 | 70.21 |
| 2 | −37.5679 | 3.4742 | 1.8061 | 40.95 |
| 3 | −102.848 | 0.6973 | | |
| 4 | 84.3099 | 6.0238 | 1.834 | 37.17 |
| 5 | −50.71 | 3.0298 | 1.6445 | 40.84 |

TABLE 1-continued

| S | R | d | nd | v |
|---|---|---|---|---|
| 6 | 40.6619 | 157.0435 | | |
| Image plane | | | | |

In Tables 1 to 28, reference sign S represents the surface number, reference sign R represents the radius of curvature (mm), reference sign d represents the inter-surface distance (mm), reference sign nd represents the refractive index to the d line (587.56 nm), reference sign v represents the Abbe number at the d line (587.56 nm), and reference sign ER represents the effective radius (mm).

Figure 3:
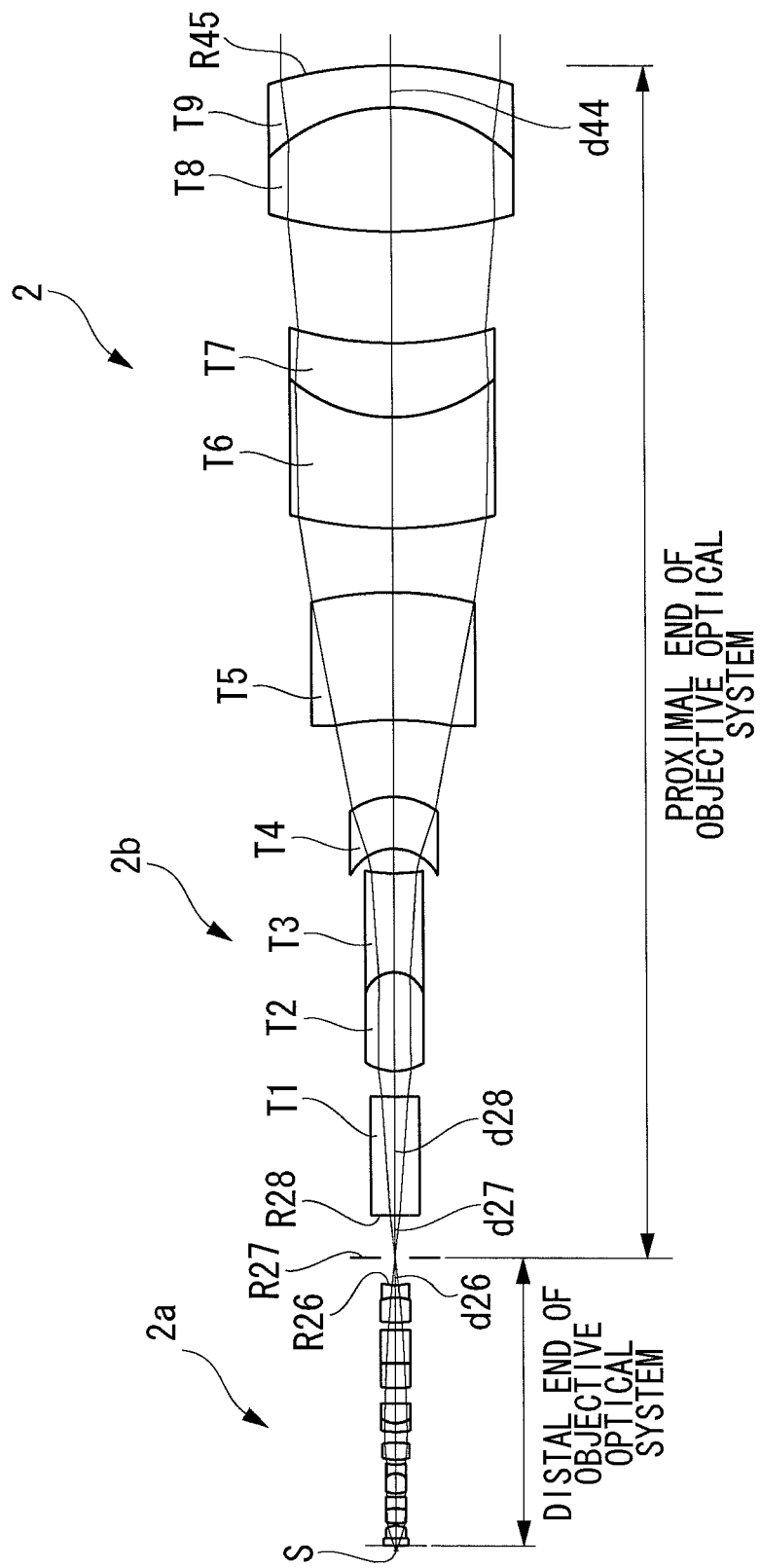
FIG. 3 is a sectional view of the objective optical system in FIG. 1.
Figure 4:
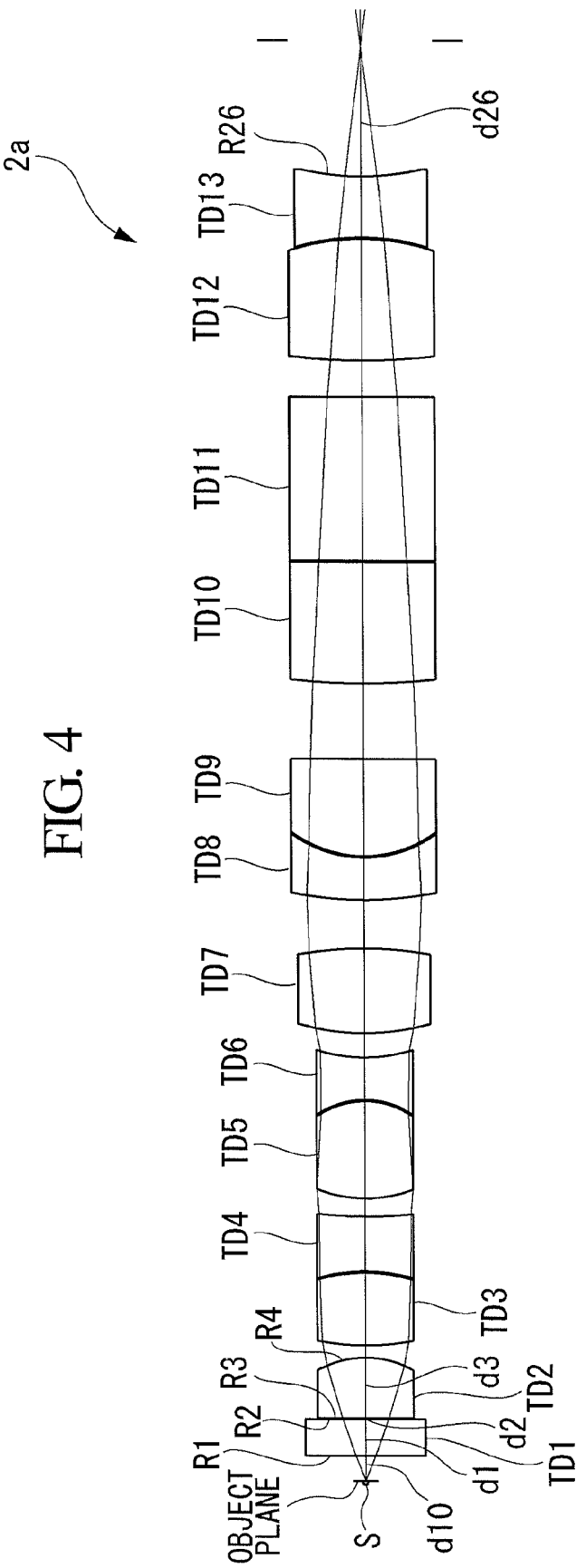
FIG. 4 is a sectional view of a distal end of the objective optical system in FIG. 3.

The lens data for the objective optical system 2 is listed in Tables 2 and 3, and the lens cross-section is illustrated in FIG. 3. The enlarged cross-section of the distal end 2a of the objective optical system 2 is illustrated in FIG. 4. Table 3 continues after Table 2.

The objective optical system 2 includes the distal end 2a and the proximal end 2b.

The distal end 2a of the objective optical system 2 includes a first lens component formed by joining a parallel flat plate TD1 and a plano-convex lens TD; a second lens component formed of a biconvex lens TD3 and a biconcave lens TD4; a third lens component formed of a biconvex lens TD5 and a biconcave lens TD6; a fourth lens component formed of a biconvex lens TD7; a fifth lens component formed of a meniscus lens TD8 and a plano-convex lens TD9; a sixth lens component formed of a plano-convex lens TD10 and a parallel flat plate TD11; and a seventh lens component formed of a biconvex lens TD12 and a biconcave lens TD13.

The proximal end 2b of objective optical system 2 includes a first lens component formed of a parallel flat plate T1; a second lens component having positive refractive power by virtue of a joined lens formed of a biconvex lens T2 and a biconcave lens T3; a third lens component formed of a negative meniscus lens T4; a fourth lens component formed of a positive meniscus lens T5; a fifth lens component having positive refractive power by virtue of a joined lens formed of a negative meniscus lens T6 and a positive meniscus lens T7; and a sixth lens component having positive refractive power by virtue of a joined lens formed of a biconvex lens T8 and a negative meniscus lens T9.

The distance *O from the object plane to the first surface (S=1) (working distance of the objective optical system) changes depending on the conditions of the variable-focus optical system 4 (refer to Table 7 for values). When the variable-focus optical system 4 is not provided, it is 0.204 (mm).

TABLE 2

| S | R | d | nd | v | ER |
|---|---|---|---|---|---|
| Object plane | | *0 | 1.33304 (Immersed) | 55.79 | |
| 1 | ∞ | 0.3 | 1.51633 | 64.14 | 0.5 |
| 2 | ∞ | 0.012 | 1.56444 | 43.79 | 0.35 |
| 3 | ∞ | 0.5 | 1.7725 | 49.6 | 0.35 |
| 4 | −0.804 | 0.1 | | | 0.4 |
| 5 | 2.049 | 0.6 | 1.741 | 52.64 | 0.4 |
| 6 | −1.392 | 0.012 | 1.56444 | 43.79 | 0.4 |
| 7 | −1.392 | 0.45 | 1.6134 | 44.27 | 0.4 |
| 8 | 3.677 | 0.15 | | | 0.4 |
| 9 | 1.108 | 0.8 | 1.43875 | 94.93 | 0.4 |
| 10 | −0.703 | 0.012 | 1.56444 | 43.79 | 0.4 |
| 11 | −0.703 | 0.35 | 1.6134 | 44.27 | 0.4 |
| 12 | 1.322 | 0.2 | | | 0.4 |
| 13 | 1.961 | 0.7 | 1.43875 | 94.93 | 0.5 |

TABLE 2-continued

| S | R | d | nd | ν | ER |
|---|---|---|---|---|---|
| 14 | −3.002 | 0.4 | | | 0.55 |
| 15 | 3.002 | 0.35 | 1.7725 | 49.6 | 0.6 |
| 16 | 1.009 | 0.012 | 1.56444 | 43.79 | 0.6 |
| 17 | 1.009 | 0.8 | 1.6779 | 55.34 | 0.6 |
| 18 | ∞ | 0.62 | | | 0.6 |
| 19 | 5.02 | 1 | 1.6779 | 55.34 | 0.6 |
| 20 | ∞ | 0.012 | 1.56444 | 43.79 | 0.6 |
| 21 | ∞ | 1.35 | 1.6779 | 55.34 | 0.6 |
| 22 | ∞ | 0.3 | | | 0.6 |
| 23 | 5.168 | 1 | 1.7725 | 49.6 | 0.6 |
| 24 | −1.869 | 0.012 | 1.56444 | 43.79 | 0.55 |
| 25 | −1.869 | 0.5 | 1.51633 | 64.14 | 0.55 |
| 26 | 2.132 | 1.12 | | | 0.5 |
| 27 | ∞(Dummy surface) | 1.5 | | | 0.6 |

TABLE 3

| S | R | d | nd | ν |
|---|---|---|---|---|
| 28 | ∞ | 4.8 | 1.7725 | 49.6 |
| 29 | ∞ | 1.035 | | |
| 30 | 2.2542 | 4 | 1.43875 | 94.93 |
| 31 | −1.2656 | 0.012 | 1.56444 | 43.79 |
| 32 | −1.2656 | 3.9 | 1.6779 | 55.34 |
| 33 | 7.2781 | 1 | | |
| 34 | −2.037 | 2.1 | 1.43875 | 94.93 |
| 35 | −3.0241 | 3.1148 | | |
| 36 | −12.4194 | 5.0573 | 1.7725 | 49.6 |
| 37 | −13.8915 | 2.5936 | | |
| 38 | 16.8618 | 4.3875 | 1.51633 | 64.14 |
| 39 | 6.4664 | 0.012 | 1.56444 | 43.79 |
| 40 | 6.4664 | 3 | 1.6779 | 55.34 |
| 41 | 15 | 4.6055 | | |
| 42 | 18.4963 | 5 | 1.43875 | 94.93 |
| 43 | −7.1858 | 0.012 | 1.56444 | 43.79 |
| 44 | −7.1858 | 1.7 | 1.7725 | 49.6 |
| 45 | −16.5908 | | | |
| Variable-focus optical system side | | | | |

Figure 5:
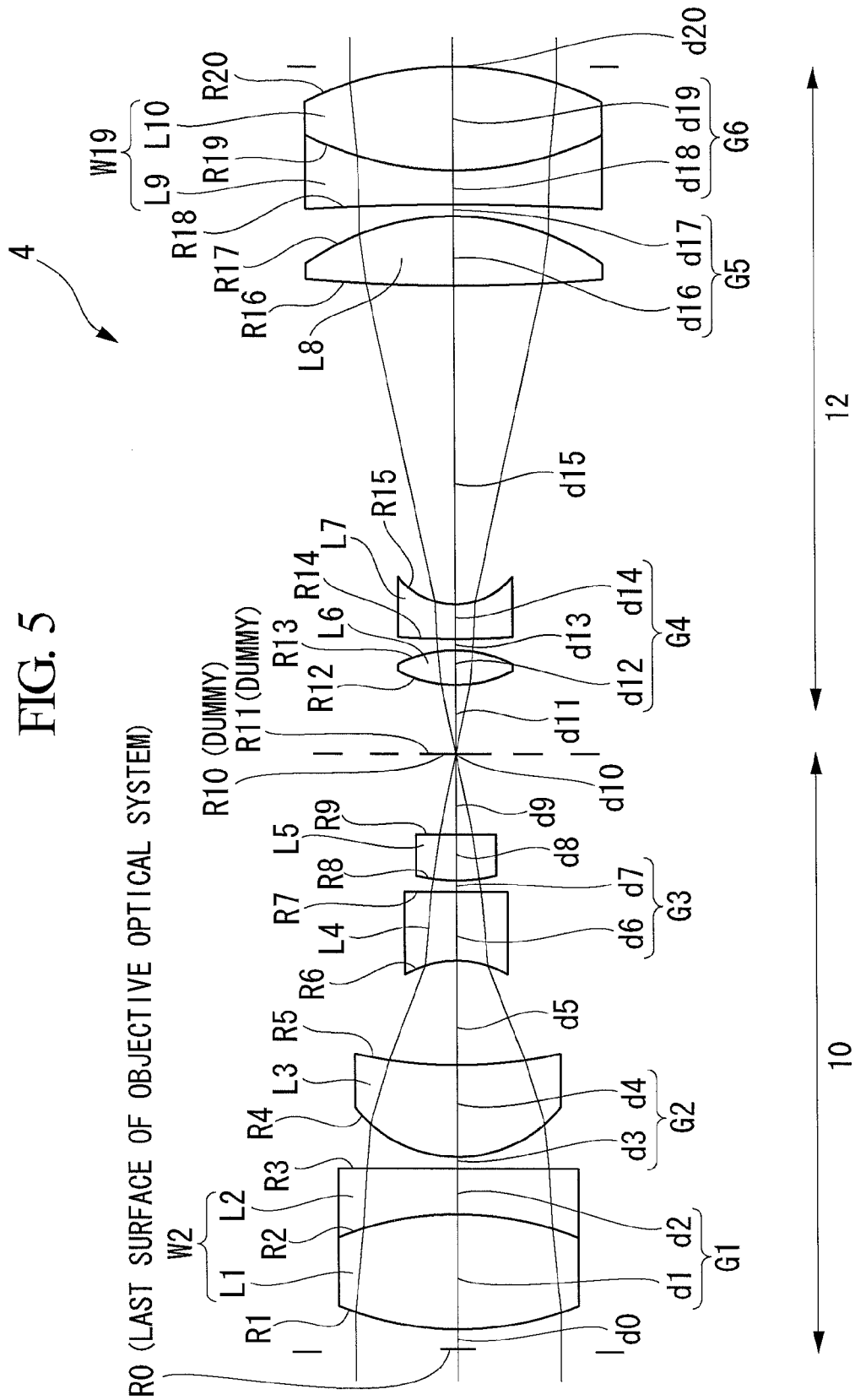
FIG. 5 is a sectional view of the variable-focus optical system in FIG. 1.

As illustrated in FIG. 5, the variable-focus optical system 4 includes a front-group optical system 10 and a rear-group optical system 12, disposed in this order from the objective optical system 2 side, and an optical-system driving unit (not shown) that drives at least one of the front-group optical system 10 and the rear-group optical system 12 in the optical axis direction and relatively changes the lengths of the front-group optical system 10 and the rear-group optical system 12 in the optical axis direction. The variable-focus optical system 4 has the lens data listed in Table 4.

TABLE 4

| S | R | d | nd | ν |
|---|---|---|---|---|
| 0 (Last surface of objective lens) | | 1 | | |
| 1 | 14.171 | 5 | 1.43875 | 94.93 |
| 2 | −14.171 | 2 | 1.6134 | 44.27 |
| 3 | ∞ | 0.5 | | |
| 4 | 5.752 | 4 | 1.43875 | 94.93 |
| 5 | 20.705 | 4.54 | | |
| 6 | −4.422 | 3 | 1.6134 | 44.27 |
| 7 | ∞ | 0.5 | | |
| 8 | 7.486 | 2 | 1.43875 | 94.93 |
| 9 | ∞ | 3.505 | | |
| 10 | ∞(Dummy surface) | *1-1 | | |
| 11 | ∞(Dummy surface) | 3.0094 | | |
| 12 | 5.469 | 1.5 | 1.48749 | 70.23 |
| 13 | −5.469 | 0.5 | | |
| 14 | 39.677 | 1.5 | 1.48749 | 70.23 |
| 15 | 3.201 | 13.87 | | |
| 16 | 77.403 | 3 | 1.43875 | 94.93 |
| 17 | −11.28 | 0.5 | | |
| 18 | −110.62 | 1.5 | 1.741 | 52.64 |
| 19 | 14.611 | 4.5 | 1.43875 | 94.93 |
| 20 | −14.611 | *1-2 | | |
| Imaging lens side | | | | |

In FIG. 5 and Table 4, the value d9 is set such that the tenth surface (s=10) matches the back focus of the front-group optical system 10, and the value d11 is set such that the eleventh surface (s=11) matches the front focus of the rear-group optical system 12. R10 and R11 are dummy surfaces, and glass is not actually provided. An afocal optical system is established when the inter-surface distances are d10=0 and d20=0. The values of inter-surface distance d10 and inter-surface distance d20 change as the rear-group optical system 12 moves in the optical axis direction (for values refer to Table 7).

The front-group optical system 10 and the rear-group optical system 12 have substantially the same positive power as each other, on the whole. The focal length Fa of the entire front-group optical system 10 is substantially the same as the focal length Fb of the entire rear-group optical system 12, as listed in Table 5.

TABLE 5

| Fa | 22.50 |
|---|---|
| Fb | 22.49 |
| Ffa | −29.90 |
| Fbb | −21.91 |
| F1 | 50.09 |
| F2 | 16.78 |
| F3 | −16.41 |
| F4 | 12.13 |
| F5 | 22.67 |
| F6 | 189.36 |

The front-group optical system 10 consists of, in order from the objective optical system 2 side, a first-group optical system G1, an second-group optical system G2, and an third-group optical system G3.

The first-group optical system G1 consists of a single joined lens W2 formed by joining a biconvex lens L1 made of low-dispersion glass (low-dispersion material) having a small refractive index and a plano-concave lens L2 made of high-dispersion glass (high-dispersion material) having a large refractive index, and has positive power as a whole (focal length F1 is positive). The joining surface R2 of the biconvex lens L1 and the plano-concave lens L2 in the joined lens W2 has negative power.

The first-group optical system G1 preferably satisfies the following Conditional Expression (1):

$$35 < v_{1L} - v_{1H} < 60 \qquad (1)$$

where $v_{1H}$ represents the d-line Abbe number of the plano-concave lens L2 of the joined lens W2, which is made of a high-dispersion glass with a large refractive index, and $v_{1L}$ represents the d-line Abbe number of the biconvex lens L1 of the joined lens W2, which is made of a low-dispersion glass with a small refractive index.

The second-group optical system G2 consists of a positive-power meniscus single lens L3 (the focal length F2 is positive). The meniscus single lens L3 is disposed such that the convex surface R4 faces the objective optical system 2.

The second-group optical system G2 preferably satisfies the following Conditional Expression (2):

$$0.6<|F2/Fa|<0.9 \quad (2)$$

where Fa represents the focal length of the entire front-group optical system 10 and F2 represents the focal length of the second-group optical system G2.

The third-group optical system G3 consists of, in order from the objective optical system 2 side, two single lenses, that is, a plano-concave lens L4 and a plano-convex lens L5. The plano-concave lens L4 disposed on the objective optical system 2 side is disposed such that the concave surface R6 faces the objective optical system 2 (F3 represents the combined focal length of the plano-concave lens L4 and the plano-convex lens L5).

The third-group optical system G3 preferably satisfies the following Conditional Expression (3):

$$0.1<|R_{G3}/Fa|<0.3 \quad (3)$$

where $R_{G3}$ represents the radius of curvature of the concave surface R6 of the plano-concave lens L4.

The rear-group optical system 12 consists of, in order from the objective optical system 2 side, an fourth-group optical system G4, an fifth-group optical system G5, and an sixth-group optical system G6.

The fourth-group optical system G4 consists of, in order from the objective optical system 2 side, two single lenses, that is, a biconvex lens L6 and a negative-power meniscus lens L7, and has positive power as a whole (the focal length F4 is positive). The fourth-group optical system G4 is disposed such that the negative-power meniscus lens L7, which is disposed on the imaging optical system 6 side, has the concave surface R15 facing toward the imaging optical system 6.

The fourth-group optical system G4 preferably satisfies the following Conditional Expression (4):

$$0.1<|R_{G4}/Fb|<0.2 \quad (4)$$

where Fb represents the focal length of the entire rear-group optical system 12, and $R_{G4}$ represents the radius of curvature of the concave surface R15 of the negative-power meniscus lens L7.

The fifth-group optical system G5 consists of a positive-power biconvex single lens L8 (the focal length F5 is positive). By virtue of the positive-power biconvex single lens L8, the surface of the fifth-group optical system G5 closest to the imaging optical system 6 is disposed such that the convex surface R17 faces the imaging optical system 6.

The fifth-group optical system G5 preferably satisfies the following Conditional Expression (5):

$$0.9<|F5/Fb|<1.2 \quad (5)$$

where F5 represents the focal length of the fifth-group optical system G5.

The sixth-group optical system G6 consists of a single joined lens W19 formed by joining a biconcave lens L9 made of high-dispersion glass having a large refractive index and a biconvex lens L10 made of low-dispersion glass having a small refractive index, and has positive power as a whole (the focal length F6 is positive). The joining surface R19 of the biconcave lens L9 and the biconvex lens L10 in the joined lens W19 has negative power.

The sixth-group optical system G6 preferably satisfies the following Conditional Expression (6):

$$40<\nu_{6L}-\nu_{6H}<60 \quad (6)$$

where $\nu_{6H}$ represents the d-line Abbe number of the biconcave lens L9 of the joined lens W19, which is made of a high-dispersion glass with a large refractive index, and $\nu_{6L}$ represents the d-line Abbe number of the biconvex lens L10 of the joined lens W19, which is made of a low-dispersion glass with a small refractive index.

The values of Conditional Expressions (1) to (6) are listed in Table 6.

TABLE 6

| (1) ν1L − ν1H | 50.66 |
|---|---|
| (2) |F2/Fa| | 0.75 |
| (3) |R3/Fa| | 0.20 |
| (4) |R4/Fb| | 0.14 |
| (5) |F5/Fb| | 1.01 |
| (6) ν6L − ν6H | 42.29 |
| (7) Fa/F3 | −1.37 |
| (8) Fb/F4 | 1.85 |

In the variable-focus optical system 4 having such a configuration, when the specimen S is irradiated with the illumination light, the light coming from the specimen S is converted to a substantially collimated beam at the objective optical system 2 and is imaged by the positive-power front-group optical system 10. Then, the light diverges, is converted to a substantially collimated beam at the positive-power rear-group optical system 12, and is imaged on the image plane by the imaging optical system 6.

When the front-group optical system 10 and the rear-group optical system 12 are in an afocal optical system relationship, the light forms substantially collimated beams between the objective optical system 2 and the front-group optical system 10 and between the rear-group optical system 12 and the imaging optical system 6. When the front-group optical system 10 and the rear-group optical system 12 are not in an afocal optical system relationship, the light is displaced from a substantially collimated beam, being diverged or converged, between the objective optical system 2 and the front-group optical system 10. In this way, the working distance of the objective optical system 2 changes.

Figure 6:
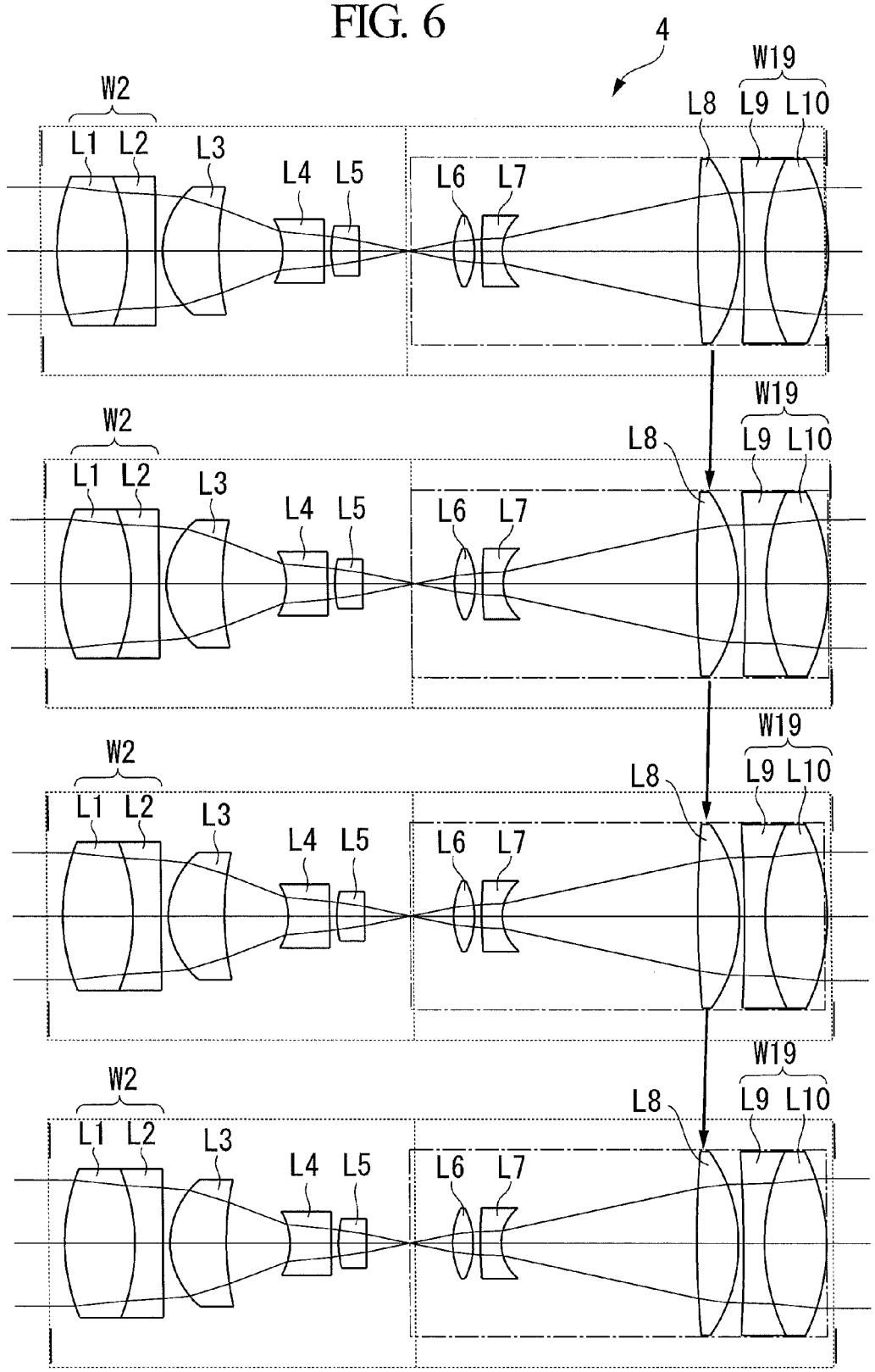
FIG. 6 is a sectional view illustrating a situation in which a rear-group optical system in the variable-focus optical system has been moved in the optical axis direction in FIG. 5.
Figure 7:
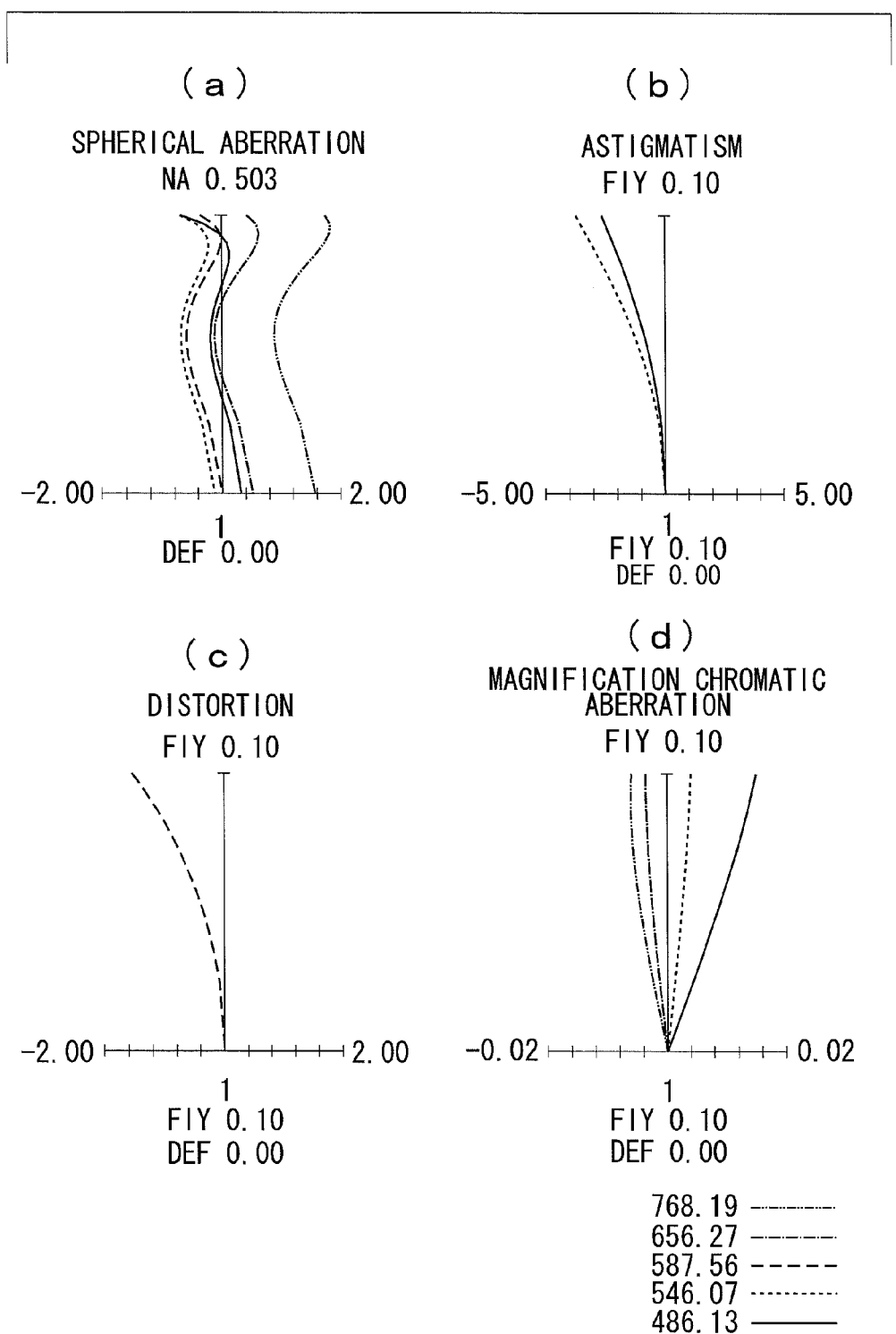
FIG. 7(a) illustrates the spherical aberration of a reference example microscope system not including a variable-focus optical system.
FIG. 7(b) illustrates astigmatism of the same.
FIG. 7(c) illustrates distortion of the same.
FIG. 7(d) illustrates magnification chromatic aberration of the same.
Figure 8:
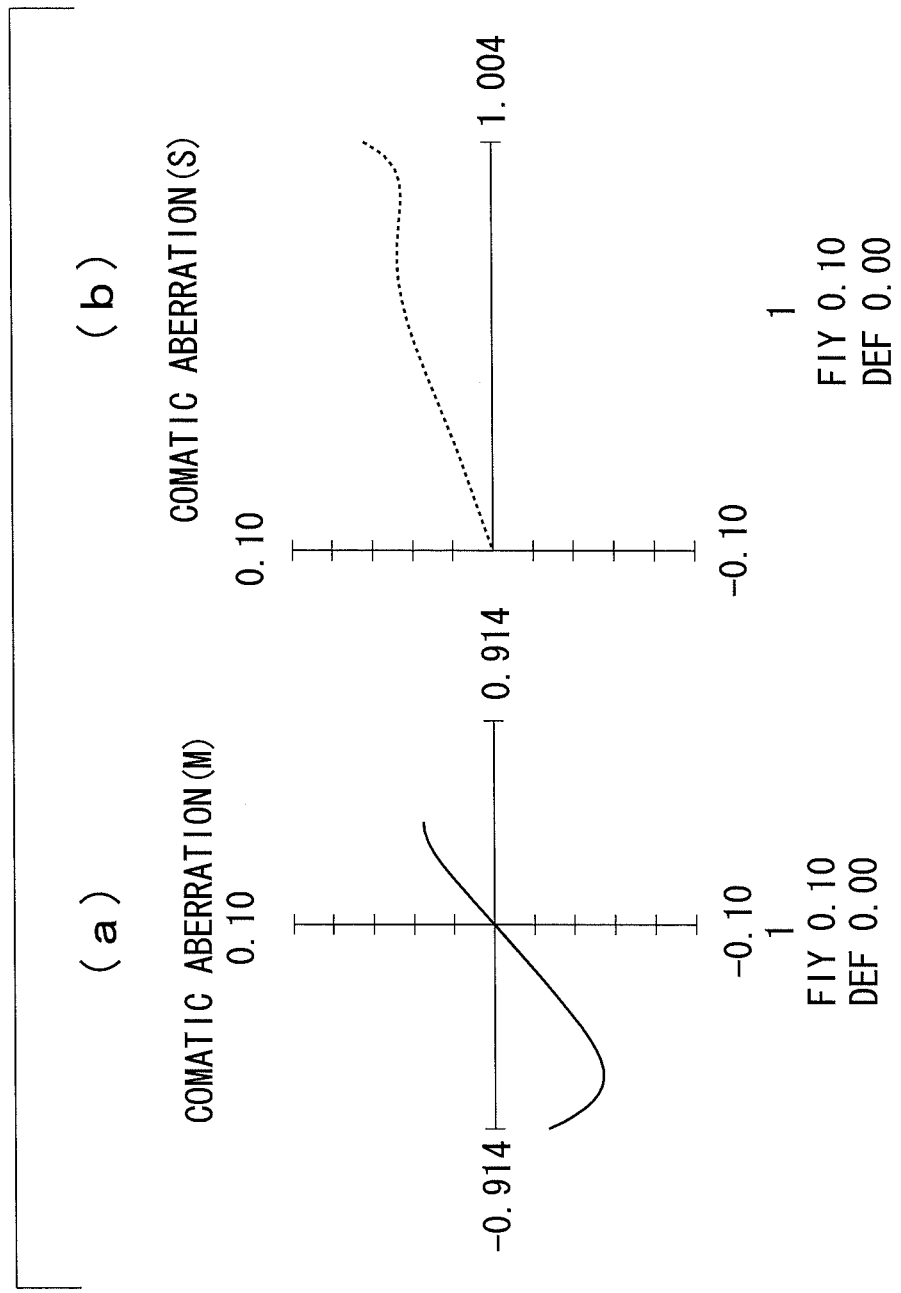
FIG. 8(a) illustrates the comatic aberration (M) of a reference example microscope system not including a variable-focus optical system.
FIG. 8(b) illustrates the comatic aberration (S) of the same.
Figure 9:
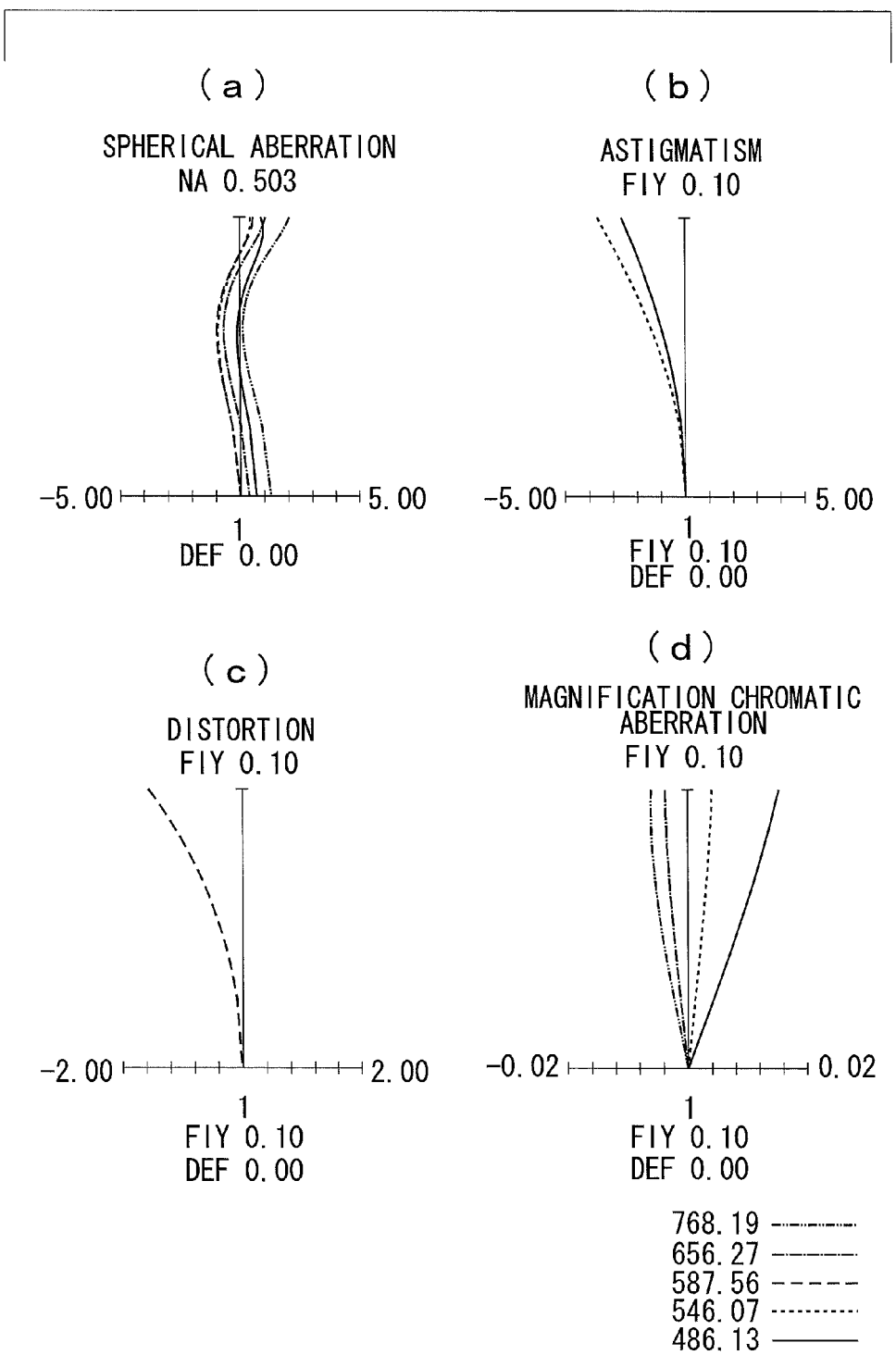
FIG. 9(a) illustrates the spherical aberration of a microscope system when a front-group optical system and a rear-group optical system of a variable-focus optical system according to this embodiment are in an afocal optical system relationship (d10=0 and d20=0)
FIG. 9(b) illustrates astigmatism of the same.
FIG. 9(c) illustrates distortion of the same.
FIG. 9(d) illustrates magnification chromatic aberration of the same.
Figure 10:
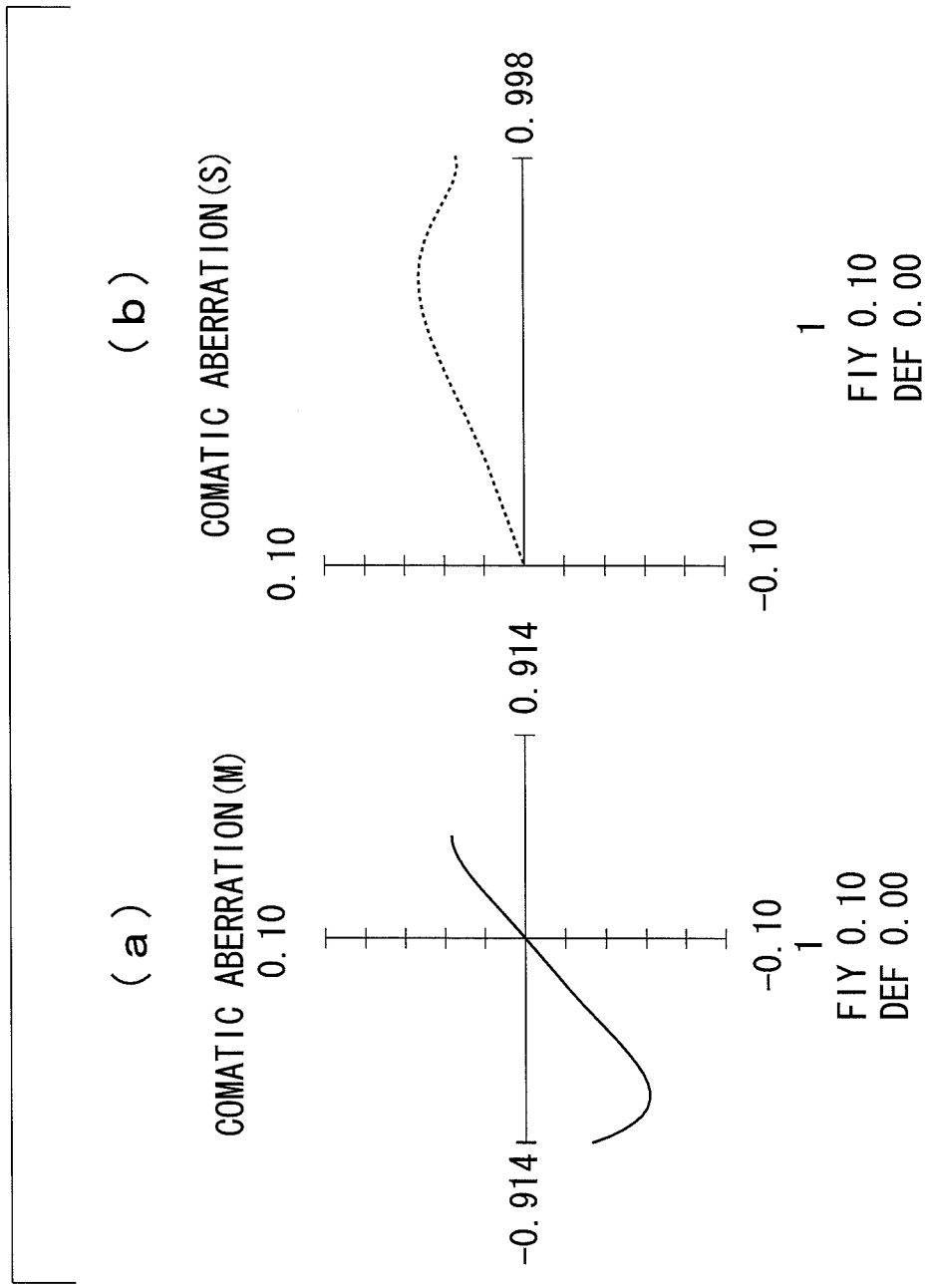
FIG. 10(a) illustrates the comatic aberration (M) of a microscope system when a front-group optical system and a rear-group optical system of a variable-focus optical system according to this embodiment are in an afocal optical system relationship (d 10=0 and d20=0)
FIG. 10(b) illustrates the comatic aberration (S) of the same.
Figure 11:
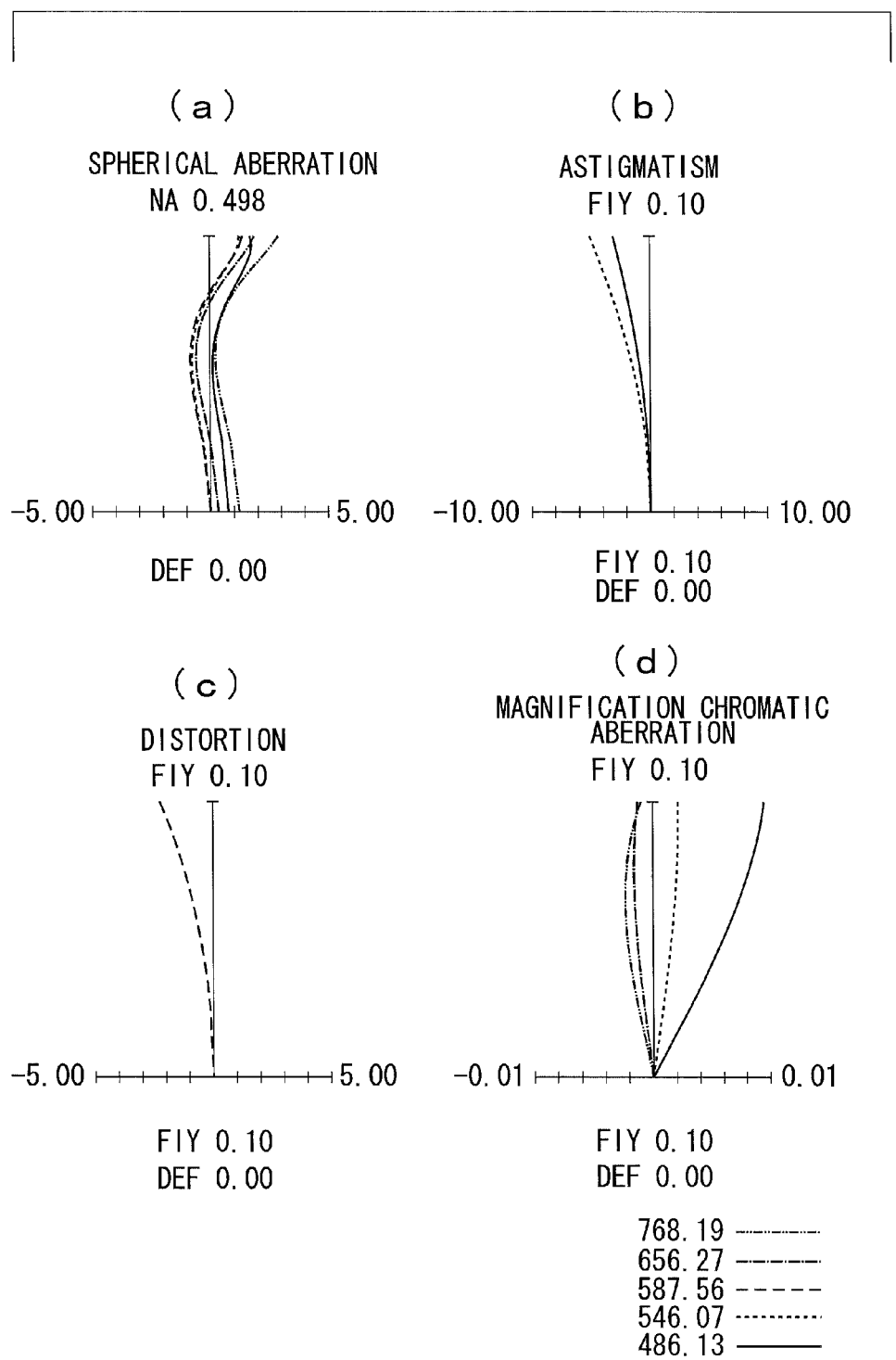
FIG. 11(a) illustrates the spherical aberration of a microscope system when a variable-focus optical system according to this embodiment satisfies d10=+0.2 and d20=−0.2.
FIG. 11(b) illustrates astigmatism of the same.
FIG. 11(c) illustrates distortion of the same.
FIG. 11(d) illustrates magnification chromatic aberration of the same.
Figure 12:
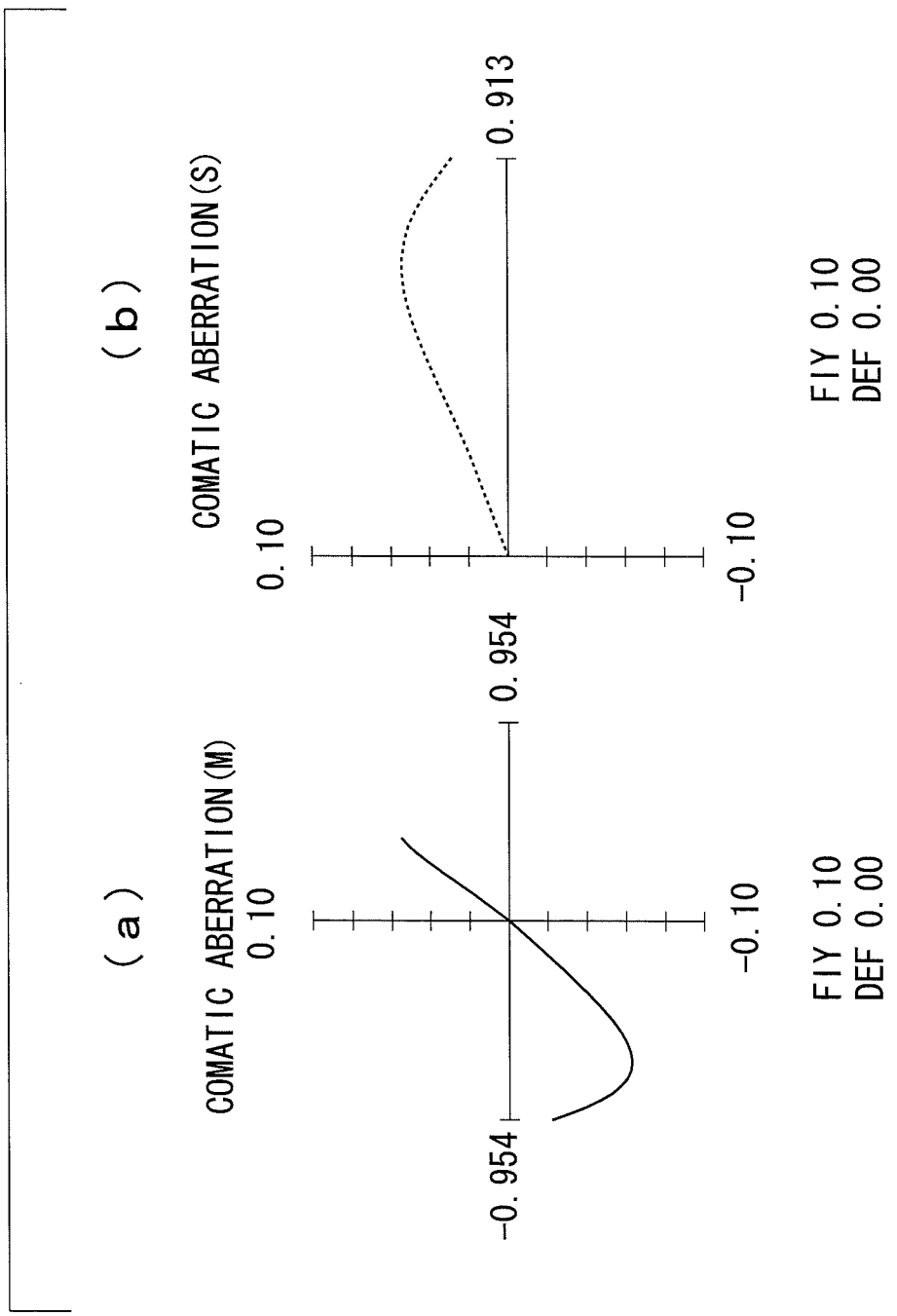
FIG. 12(a) illustrates the comatic aberration (M) of a microscope system when a variable-focus optical system according to this embodiment satisfies d10=+0.2 and d20=−0.2.
FIG. 12(b) illustrates the comatic aberration (S) of the same.
Figure 13:
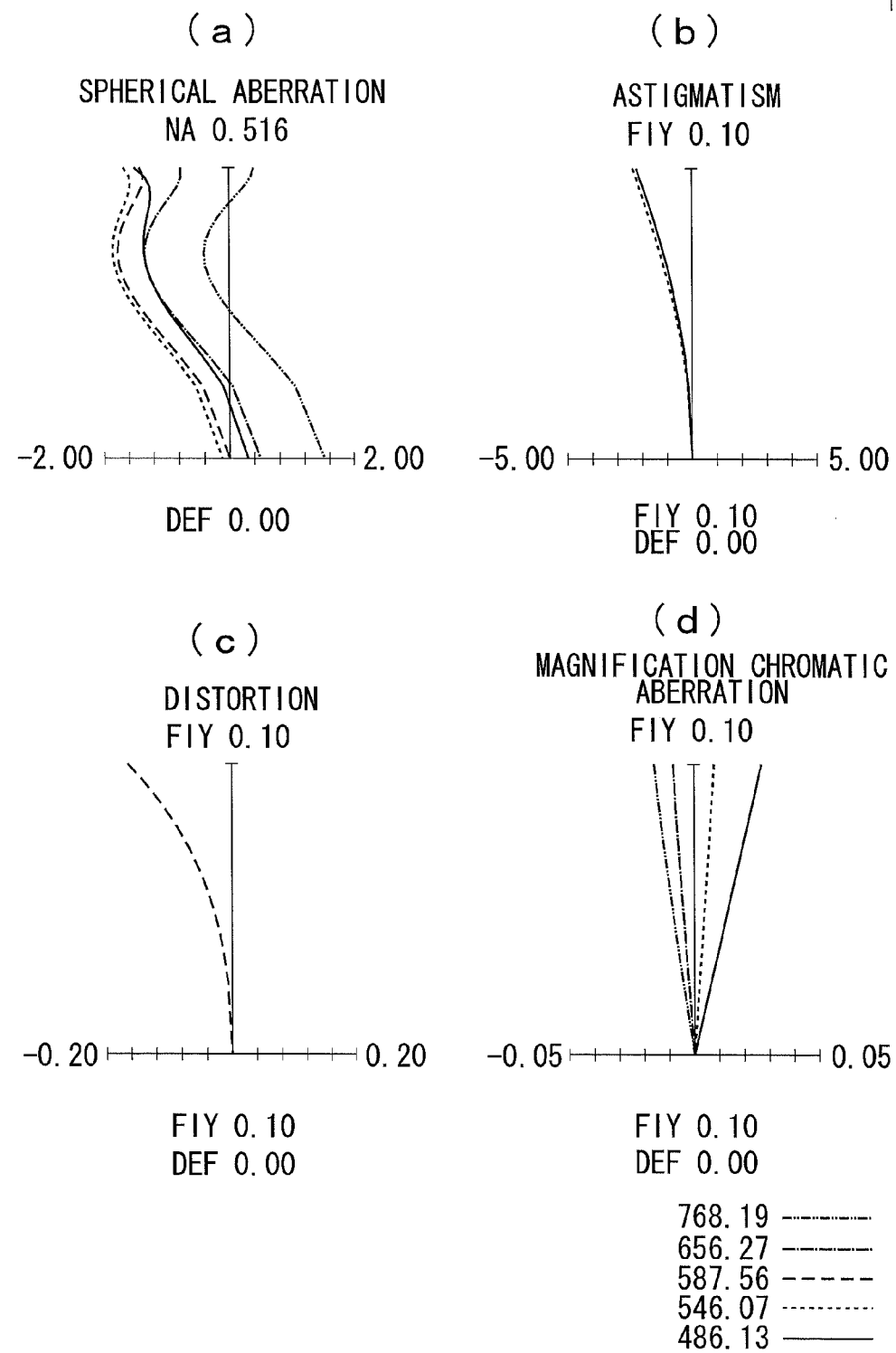
FIG. 13(a) illustrates the spherical aberration in a microscope system when a variable-focus optical system according to this embodiment satisfies d10=−0.4 and d20=+0.4.
FIG. 13(b) illustrates astigmatism of the same.
FIG. 13(c) illustrates distortion of the same.
FIG. 13(d) illustrates magnification chromatic aberration of the same.
Figure 14:
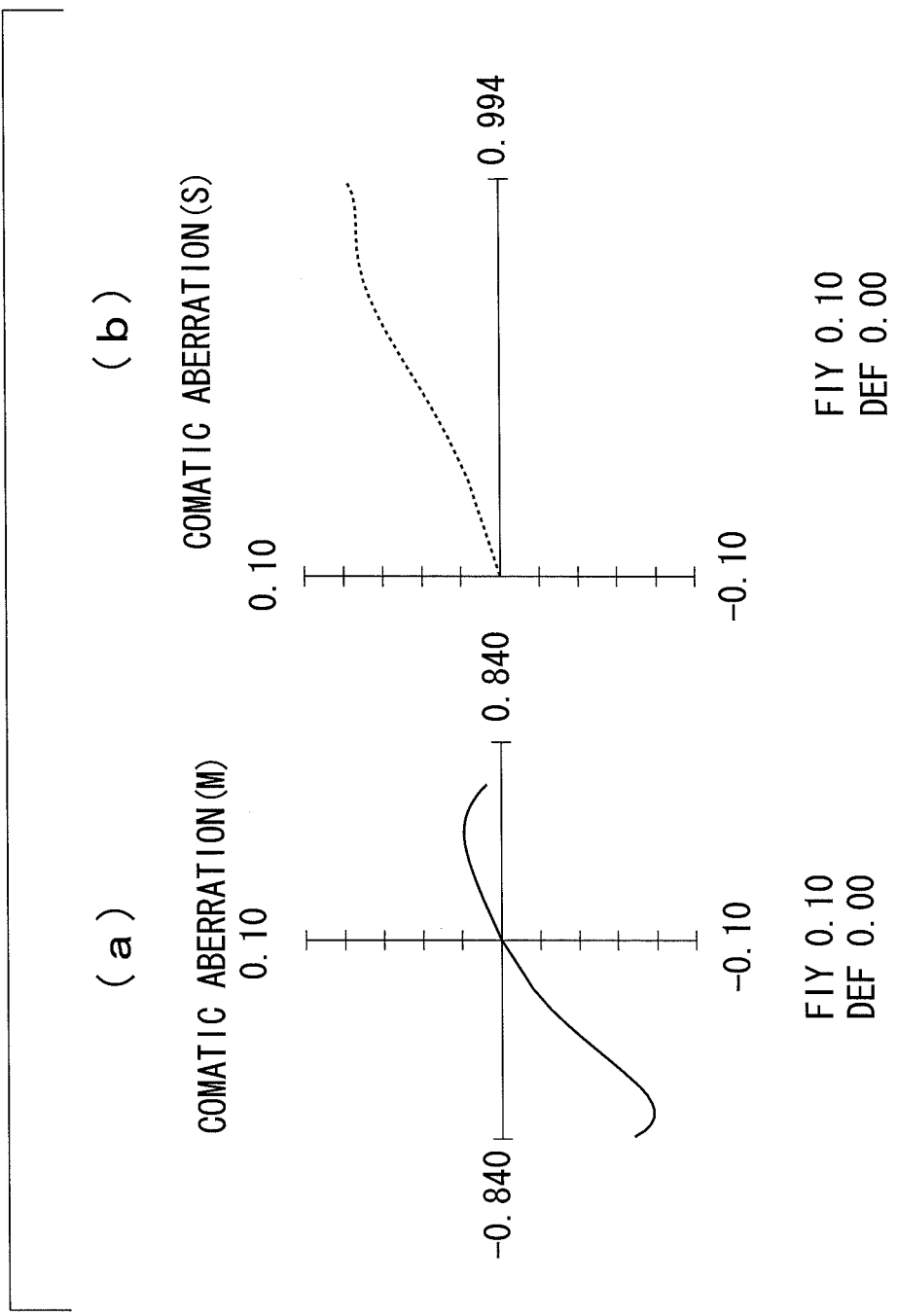
FIG. 14(a) illustrates the comatic aberration (M) of a microscope system when a variable-focus optical system according to this embodiment satisfies d10=−0.4 and d20=+0.4.
FIG. 14(b) illustrates the comatic aberration (S) of the same.

Thus, for example, as illustrated in FIG. 6, by operating the optical-system driving unit, the entire rear-group optical system 12 is driven in the optical axis direction, changing the working distance of the objective optical system 2. The changes in the position of the rear-group optical system 12, the working distance of the objective optical system 2, the magnification of the entire variable-focus optical system 4, and the object side NA of the objective optical system 2 are listed in Table 7. According to Table 7, the magnification of the entire variable-focus optical system 4 shows almost no change in response to the movement of the rear-group optical system 12, but the working distance of the objective optical system 2 changes substantially linearly.

TABLE 7

| | | | | |
|---|---|---|---|---|
| Inter-surface distance of tenth surface d10 (*1-1) (mm) | 0.2 | 0 | −0.2 | −0.4 |
| Inter-surface distance of twentieth surface d20 (*1-2) (mm) | −0.2 | 0 | 0.2 | 0.4 |
| Lateral magnification | −20.01 | −20.05 | −20.09 | −20.13 |
| NA | 0.498 | 0.503 | 0.510 | 0.516 |
| Working distance of objective optical system (*0) (mm) | 0.161 | 0.204 | 0.246 | 0.288 |

In this embodiment, by setting the power of the rear-group optical system 12 substantially the same as the power of the front-group optical system 10, the light coming from the specimen S can be relayed from the objective optical system 2 to the imaging optical system 6 without changing the absolute value of the magnification of the objective optical system 2.

The axial chromatic aberration can be corrected by the joining surface R2 of the joined lens W2 in the first-group optical system G1. If the first-group optical system G1 falls below the lower limit of Conditional Expression (1), the axial chromatic aberration becomes too large. In contrast, there are almost no lens materials that exceed the upper limit of Conditional Expression (1).

The light coming from the objective optical system 2 is converged by the meniscus single lens L3 in the second-group optical system G2. By disposing the convex surface R4 of the meniscus single lens L3 facing the objective optical system 2, the generation of spherical aberration can be reduced. If the second-group optical system G2 falls below the lower limit of Conditional Expression (2), the spherical aberration becomes too large. In contrast, if the upper limit of Conditional Expression (2) is exceeded, light will not be sufficiently converged.

The spherical aberration generated by the second-group optical system G2 can be corrected by the concave surface R6 of the plano-concave lens L4 in the third-group optical system G3. The field curvature and the comatic aberration can be corrected by the concave surface R6. If the third-group optical system G3 falls below the lower limit of Conditional Expression (3), comatic aberration is overcorrected. In contrast, if the upper limit of Conditional Expression (3) is exceeded, the spherical aberration, the field curvature, and the comatic aberration are corrected insufficiently.

The spherical aberration generated by the fifth-group optical system G5 can be corrected by the concave surface R15 of the negative-power meniscus lens L7 in the fourth-group optical system G4. The field curvature and the comatic aberration can be corrected by the concave surface R15. If the fourth-group optical system G4 falls below the lower limit of Conditional Expression (4), the comatic aberration is overcorrected. In contrast, if the upper limit of Conditional Expression (4) is exceeded, the spherical aberration, the field curvature, and the comatic aberration are corrected insufficiently.

The light converged/diverged at the front-group optical system 10 is restored to a collimated beam by the biconvex single lens L8 in the fifth-group optical system G5. By having the convex surface R17 of the biconvex single lens L8 facing toward the imaging optical system 6, the generation of spherical aberration can be reduced. If the fifth-group optical system G5 falls below the lower limit of Conditional Expression (5), the spherical aberration becomes too large. In contrast, if the upper limit of Conditional Expression (5) is exceeded, the light cannot be restored to a collimated beam.

The axial chromatic aberration can be corrected by the joining surface R19 of the joined lens W19 in the sixth-group optical system G6. If the sixth-group optical system G6 falls below the lower limit of Conditional Expression (6), the axial chromatic aberration becomes too large. In contrast, there are almost no lens materials that exceed the upper limit of Conditional Expression (6).

As a reference example, the usage data of a microscope system that does not include a variable-focus optical system, i.e., a microscope system including the objective optical system 2 and the imaging optical system 6, is listed in Table 8, and aberration thereof is shown in FIGS. 7(a), 7(b), 7(c), 7(d), 8(a), and 8(b). FIG. 7(a) illustrates spherical aberration; FIG. 7(b) illustrates astigmatism; FIG. 7(c) illustrates distortion; FIG. 7(d) illustrates magnification chromatic aberration; FIG. 8(a) illustrates comatic aberration (M); and FIG. 8(b) illustrates comatic aberration (S). FIGS. 7(a) to 7(d), 8(a), and 8(b) illustrate aberration at the image plane, where reference sign NA represents the object side NA and reference sign FIY represents the object height. For astigmatism, the solid line represents astigmatism in the meridional plane, and the dotted line represents astigmatism in the sagittal plane. These also apply to the corresponding drawings: FIGS. 9(a) to 9(d), 10(a), and 10(b); FIGS. 11(a) to 11(d), 12(a), and 12(b); FIGS. 13(a) to 13(d), 14(a), and 14(b); FIGS. 16(a) to 16(d), 17(a), and 17(b); FIGS. 19(a) to 19(d), 20(a), and 20(b); FIGS. 22(a) to 22(d), 23(a), and 23(b); FIGS. 25(a) to 25(d), 26(a), and 26(b); and FIGS. 28(a) to 28(d), 29(a), and 29(b).

TABLE 8

| Lateral magnification | 20.04 |
|---|---|
| NA | 0.503 |
| Working distance of objective optical system (*0) (mm) | 0.204 |

The aberration of the microscope system 100 including the variable-focus optical system 4 according to this embodiment is illustrated in FIGS. 9(a) to 9(d), 10(a), 10(b), 11(a) to 11(d), 12(a), 12(b), 13(a) to 13(d), 14(a), and 14(b). FIGS. 9(a) to 9(d), 10(a), and 10(b) illustrate the aberration when the front-group optical system 10 and the rear-group optical system 12 are in an afocal optical system relationship, i.e., when d10=0 and d20=0. FIGS. 11(a) to (d), 12(a), and 12(b) illustrate the aberrations when d10=+0.2 and d20=−0.2. FIGS. 13(a) to (d), 14(a), and 14(b) illustrate the aberrations when d10=−0.4 and d20=+0.4.

By comparing the microscope system 100 including the variable-focus optical system 4 according to this embodiment and a reference example microscope system that does not include a variable-focus optical system, it is clear that the changes in the spherical aberration, field curvature, comatic aberration, and axial chromatic aberration of the microscope system 100 including the variable-focus optical system 4 according to this embodiment are small, due to the presence of the variable-focus optical system 4. Thus, the variable-focus optical system 4 according to this embodiment can sufficiently correct aberrations and acquire an excellent image.

In this embodiment, the variable-focus optical system 4 may satisfy the following Conditional Expressions (7) and (8).

$$-1.8 < Fa/F3 < 0.2 \quad (7)$$

$$1.5 < Fb/F4 < 2.2 \quad (8)$$

where F3 represents the focal length of the third-group optical system G3, and F4 represents the focal length of the fourth-group optical system G4.

By satisfying Conditional Expression (7), the front focal distance of the front-group optical system 10 (the coordinate of the front focus of the entire front-group optical system 10 when the surface of the front-group optical system 10 closest to the objective optical system 2 is set as the origin) Ffa is set to a negative value, and the displacement of the back focus of the objective optical system 2 and the front focus of the front-group optical system 10 can be reduced. For example, the displacement is 4.9 mm. In this way, when the rear-group optical system 12 is moved in the direction of the optical axis, the change in the magnification of the entire variable-focus optical system 4 can be reduced. In such a case, if the value falls below the lower limit of Conditional Expression (7), the comatic aberration becomes too large. In contrast, if the value exceeds the upper limit of Conditional Expression (7), the front focal distance of the front-group optical system 10 cannot be set to a negative value.

By satisfying Conditional Expression (8), the back focal distance Fbb of the rear-group optical system 12 (the coordinate of the back focus of the entire rear-group optical system 12 when the surface of the rear-group optical system 12 closest to the imaging optical system 6 is set as the origin) can be set to a negative value. In this way, the variable-focus optical system 4 can be prevented from becoming long. In such a case, if the value falls below the lower limit of Conditional Expression (8), the back focal distance of the rear-group optical system 12 is not set to a negative value. In contrast, if the value exceeds the upper limit of Conditional Expression (8), the comatic aberration increases.

In this embodiment, the variable-focus optical system 4 may satisfy the following Conditional Expression (9).

$$0.1 < Fa/Ftl < 0.2 \qquad (9)$$

where Ftl represents the focal length of the imaging optical system 6.

Conditional Expression (9) is a condition for satisfactorily correcting aberrations without increasing the total length of the variable-focus optical system 4. The focal lengths of the front-group optical system 10 and the rear-group optical system 12 are each set to, for example, 22.5 mm. By satisfying Conditional Expression (9), the total length of the variable-focus optical system 4 does not become too long, and aberrations can be satisfactorily corrected. In such a case, if the value falls below the lower limit of Conditional Expression (9), the NA of a beam between the front-group optical system 10 and the rear-group optical system 12 becomes too large, making various types of aberration correction difficult. In contrast, if the value exceeds the upper limit of Conditional Expression (9), the total length becomes too large.

This embodiment can be modified as described below.

Figure 15:
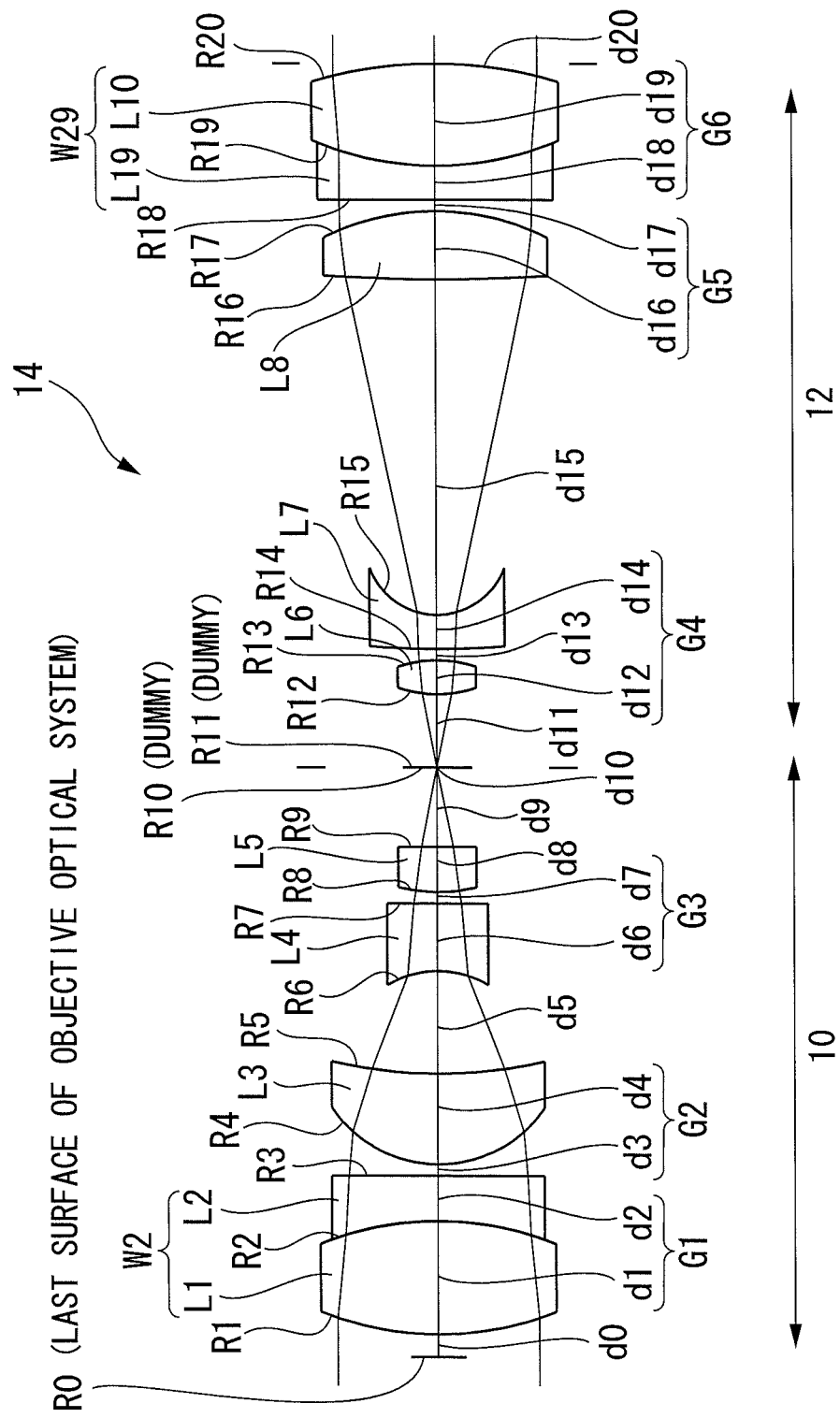
FIG. 15 is a sectional view of a variable-focus optical system according to a first modification of the embodiment of the present invention.
Figure 16:
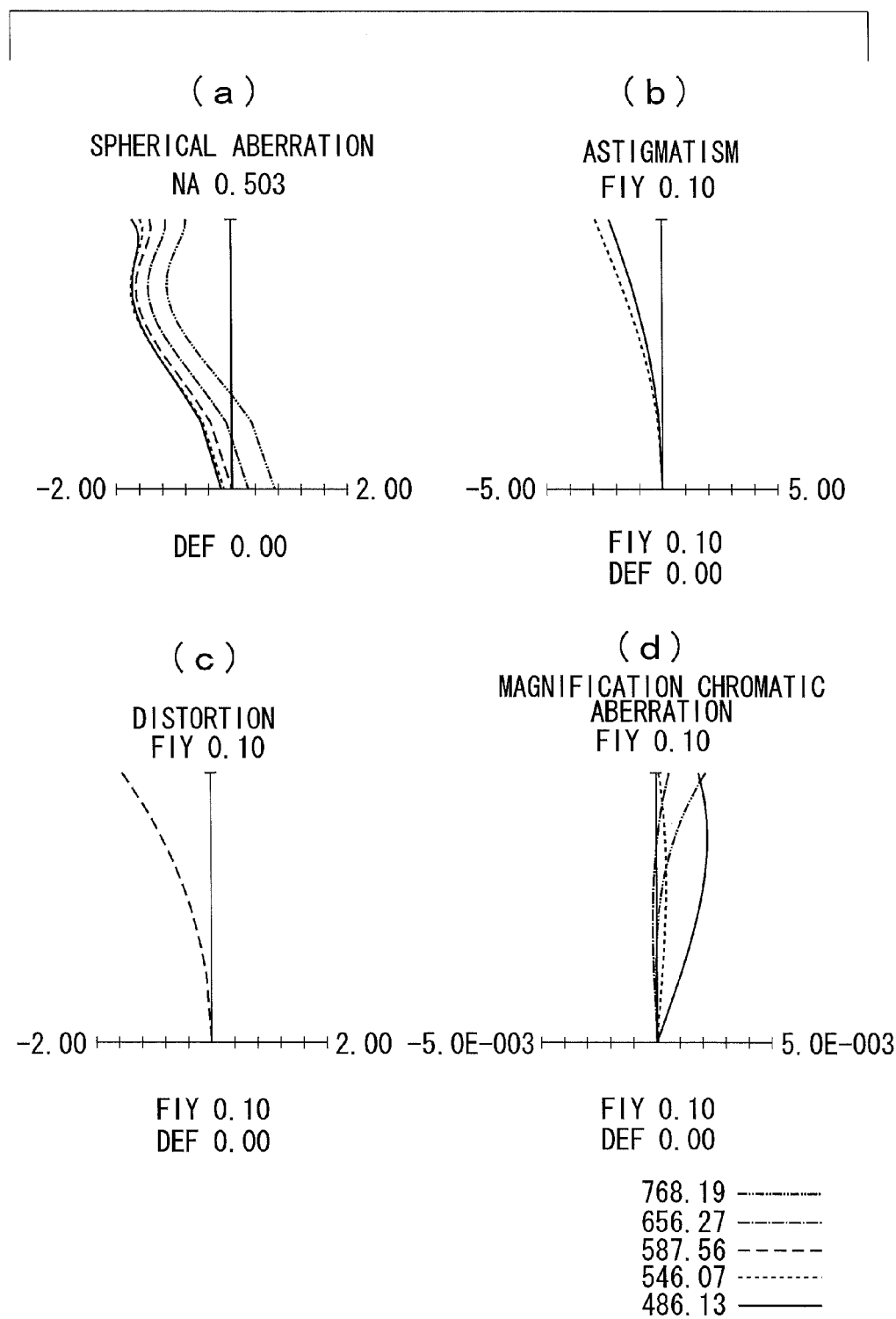
FIG. 16(a) illustrates the spherical aberration of a microscope system when a front-group optical system and a rear-group optical system of the variable-focus optical system in FIG. 15 are in an afocal optical system relationship.
FIG. 16(b) illustrates astigmatism of the same.
FIG. 16(c) illustrates distortion of the same.
FIG. 16(d) illustrates magnification chromatic aberration of the same.
Figure 17:
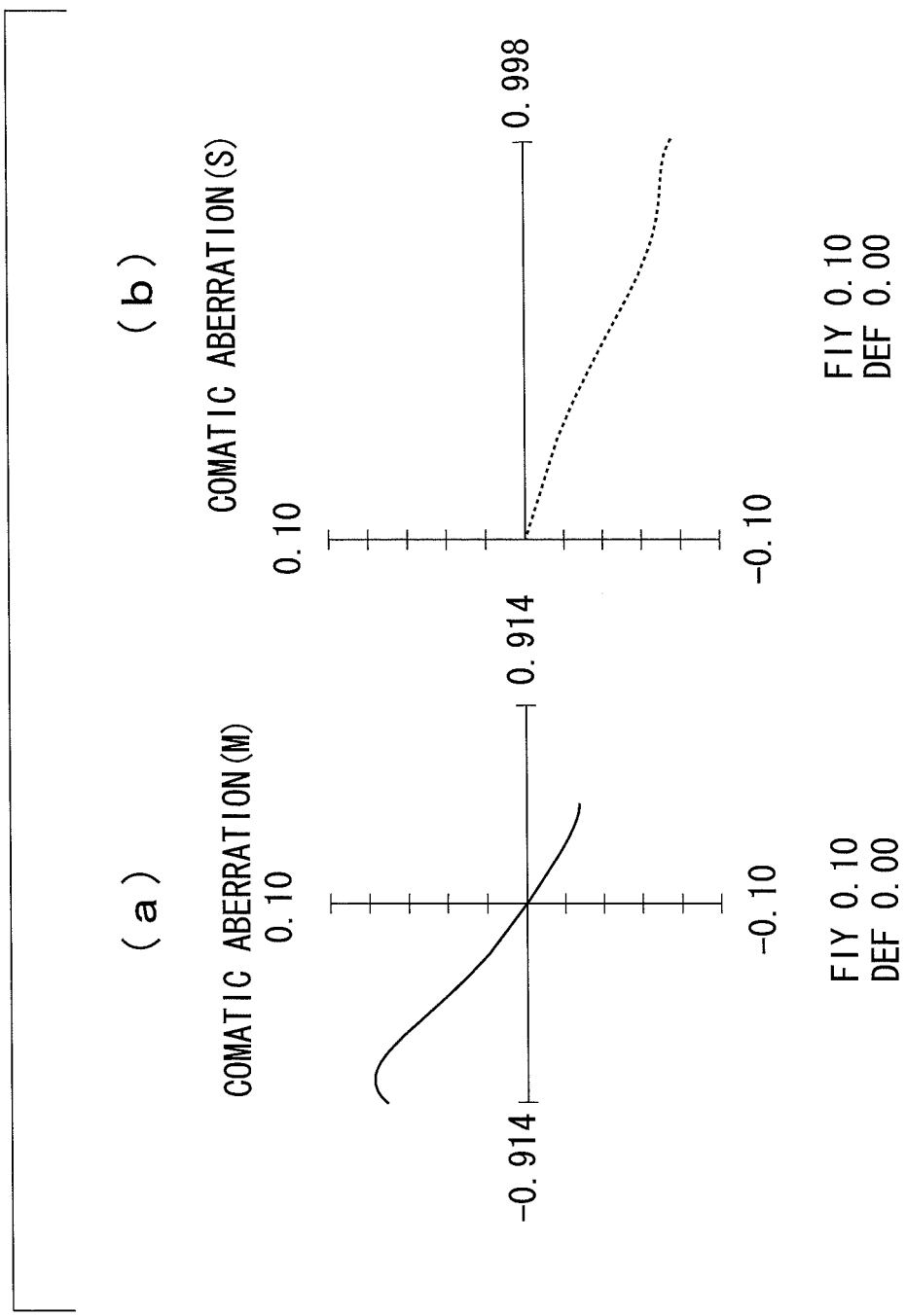
FIG. 17(a) illustrates the comatic aberration (M) when a front-group optical system and a rear-group optical system of the variable-focus optical system in FIG. 15 are in an afocal optical system relationship.
FIG. 17(b) illustrates the comatic aberration (S) of the same.

In this embodiment, the sixth-group optical system G6 consists of the single joined lens W2 formed by joining the biconcave lens L9, which is made of high-dispersion glass with a large refractive index, and the biconvex lens L10, which is made of low-dispersion glass with a small refractive index. Instead, for example, in a variable-focus optical system 14 according to a first modification, as illustrated in FIG. 15, the sixth-group optical system G6 may consist of a single joined lens W29 formed by joining a plano-concave lens L19 made of high-dispersion glass and a biconvex lens L10 made of low-dispersion glass.

In such a case, the sixth-group optical system G6 may have positive power on the whole (the focal length F6 is positive), and the joining surface R19 of the joined lens 12 may have negative power, on the whole. It is desirable that Conditional Expressions (1) to (6) be all satisfied and that spherical aberration, field curvature, comatic aberration, and axial chromatic aberration be satisfactorily corrected. The configurations of the first-group optical system G1 to fifth-group optical system G5 and Conditional Expressions (7) to (9) are the same as those according to the above-described embodiment. The variable-focus optical system 14 according to this modification has the lens data listed in Table 9.

TABLE 9

| S | R | d | nd | ν |
|---|---|---|---|---|
| 0 (Last surface of objective lens) | | 1 | | |
| 1 | 14.171 | 5 | 1.43875 | 94.93 |
| 2 | −14.171 | 2 | 1.6134 | 44.27 |
| 3 | ∞ | 0.5 | | |
| 4 | 5.752 | 4 | 1.43875 | 94.93 |
| 5 | 20.705 | 4.54 | | |
| 6 | −4.422 | 3 | 1.6134 | 44.27 |
| 7 | ∞ | 0.5 | | |
| 8 | 7.486 | 2 | 1.43875 | 94.93 |
| 9 | ∞ | 3.505 | | |
| 10 | ∞(Dummy surface) | *2-1 | | |
| 11 | ∞(Dummy surface) | 3.2337 | | |
| 12 | 5.469 | 1.5 | 1.48749 | 70.23 |
| 13 | −5.469 | 0.5 | | |
| 14 | 39.677 | 1.5 | 1.48749 | 70.23 |
| 15 | 3.201 | 14.82 | | |
| 16 | 77.403 | 3 | 1.43875 | 94.93 |
| 17 | −11.28 | 0.5 | | |
| 18 | ∞ | 1.5 | 1.741 | 52.64 |
| 19 | 14.132 | 4.5 | 1.43875 | 94.93 |
| 20 | −19.274 | *2-2 | | |
| Imaging lens side | | | | |

FIGS. 16(a) to 16(d), 17(a), and 17(b) illustrate the aberrations when the front-group optical system 10 and the rear-group optical system 12 are in an afocal optical system relationship, i.e., when d10=0 and d20=0. The magnification of the variable-focus optical system 14, the object side NA of the objective optical system 2, and the working distance of the objective optical system 2 (the value when the objective optical system 2, the variable-focus optical system 14, and the imaging optical system 6 are combined) when the inter-surface distances d10 and d20 change due to the rear-group optical system 12 moving in the optical axis direction are listed in Table 10. The parameters of the variable-focus optical system 14 are listed in Table 11. The values of Conditional Expressions (1) to (8) are listed in Table 12.

TABLE 10

| | | | | |
|---|---|---|---|---|
| Inter-surface distance of tenth surface d10 (*2-1) (mm) | 0.2 | 0 | −0.2 | −0.4 |
| Inter-surface distance of twentieth surface d20 (*2-2) (mm) | −0.2 | 0 | 0.2 | 0.4 |
| Lateral magnification | −19.94 | −19.98 | −20.02 | −20.06 |
| NA | 0.498 | 0.503 | 0.510 | 0.516 |
| Working distance of objective optical system (*0) (mm) | 0.161 | 0.204 | 0.246 | 0.288 |

TABLE 11

| | |
|---|---|
| Fa | 22.50 |
| Fb | 22.57 |
| Ffa | −29.90 |
| Fbb | −23.11 |
| F1 | 50.09 |
| F2 | 16.78 |
| F3 | −16.41 |
| F4 | 12.13 |
| F5 | 22.67 |
| F6 | 344.94 |

TABLE 12

| | | |
|---|---|---|
| (1) ν1L − ν1H | 50.66 |
| (2) \|F2/Fa\| | 0.75 |
| (3) \|R3/Fa\| | 0.20 |
| (4) \|R4/Fb\| | 0.14 |
| (5) \|F5/Fb\| | 1.00 |
| (6) ν6L − ν6H | 52.64 |
| (7) Fa/F3 | −1.37 |
| (8) Fb/F4 | 1.86 |

By comparing the aberrations of the reference example microscope system that does not include a variable-focus optical system (FIGS. 7(a) to 7(d), 8(a), and 8(b)) and the aberrations of the microscope system 100 including the variable-focus optical system 14 according to this modification (FIGS. 16(a) to 16(d), 17(a), and 17(b)), it is clear that the changes in the spherical aberration, field curvature, comatic aberration, and axial chromatic aberration of the microscope system 100 including the variable-focus optical system 14 according to this modification are small, due to the presence of the variable-focus optical system 14.

Figure 18:
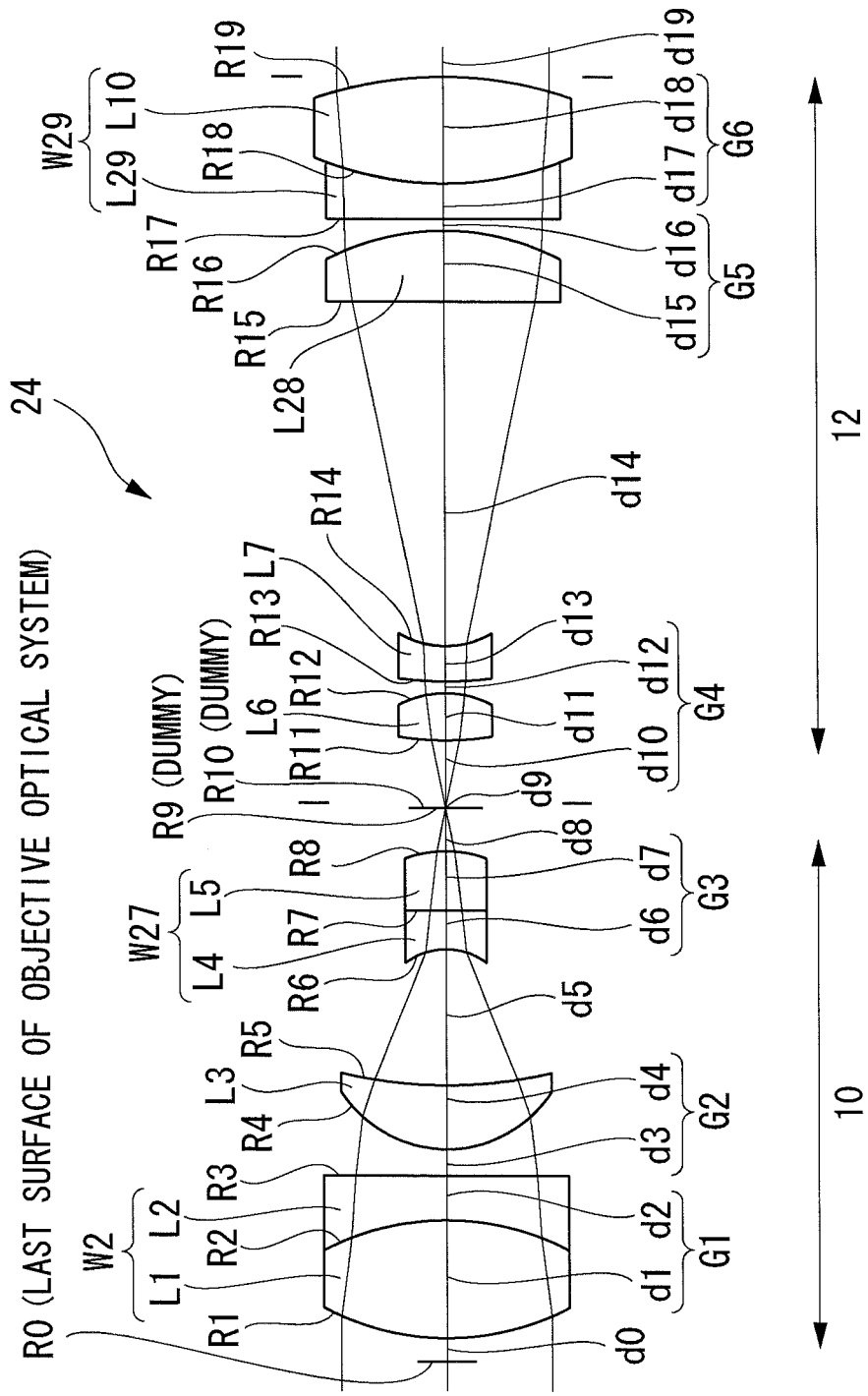
FIG. 18 is a sectional view of a variable-focus optical system according to a second modification of an embodiment of the present invention.
Figure 19:
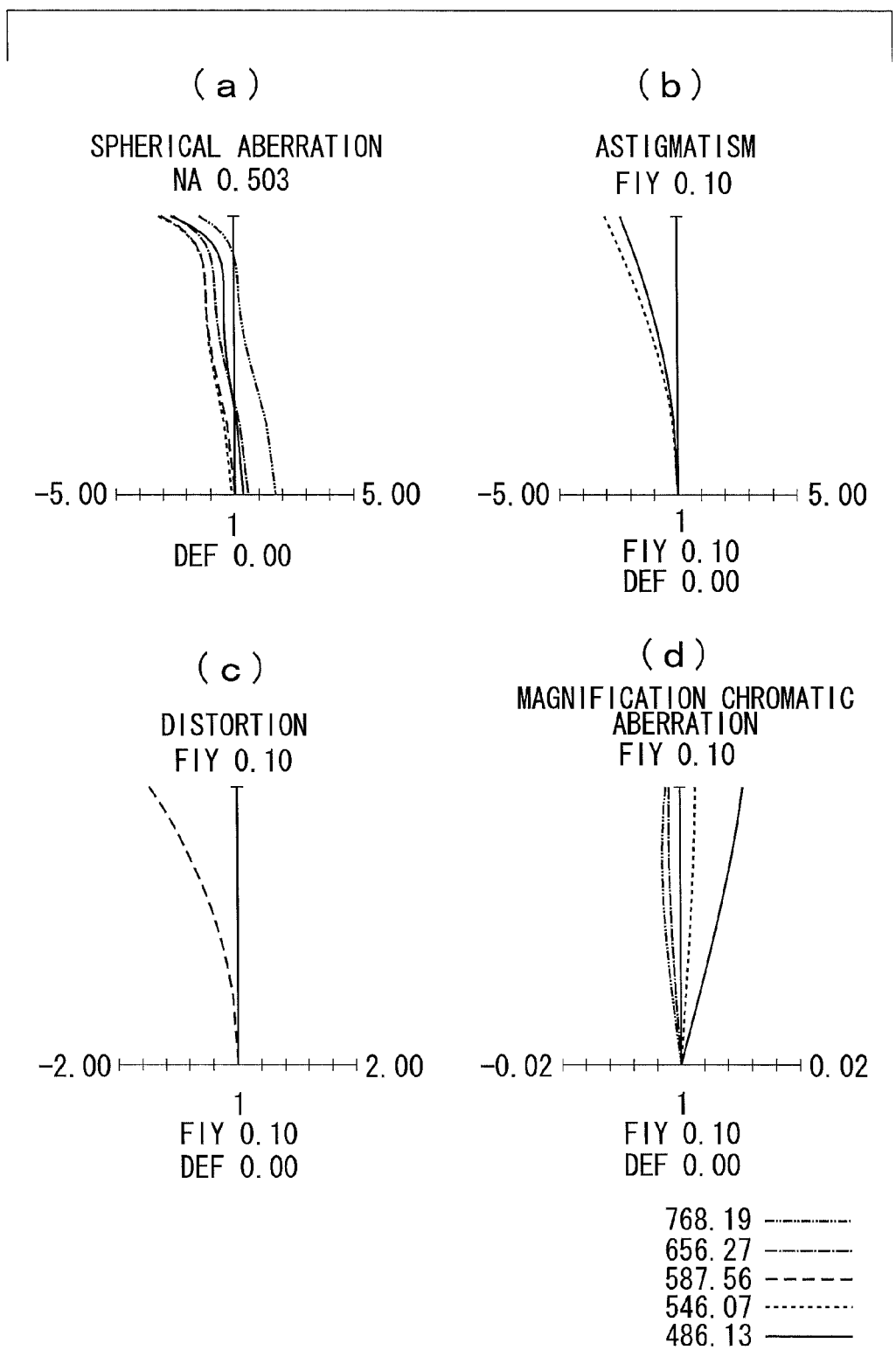
FIG. 19(a) illustrates the spherical aberration of a microscope system when a front-group optical system and a rear-group optical system of the variable-focus optical system in FIG. 18 are in an afocal optical system relationship.
FIG. 19(b) illustrates astigmatism of the same.
FIG. 19(c) illustrates distortion of the same.
FIG. 19(d) illustrates magnification chromatic aberration of the same.
Figure 20:
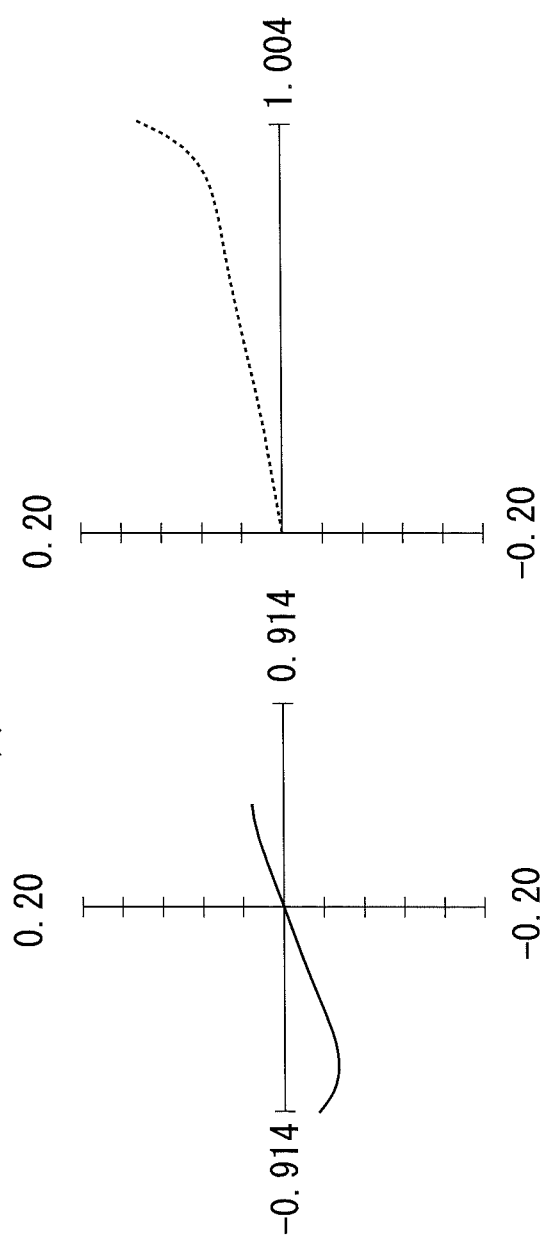
FIG. 20(a) illustrates the comatic aberration (M) of a microscope system when a front-group optical system and a rear-group optical system of the variable-focus optical system in FIG. 18 are in an afocal optical system relationship.
FIG. 20(b) illustrates the comatic aberration (S) of the same.

A variable-focus optical system 24 according to a second modification may be modified, for example, as described below. That is, in the above-described embodiment, the third-group optical system G3 consists of two single lenses, that is, the plano-concave lens L4 and the plano-convex lens L5. In this modification, however, as illustrated in FIG. 18, the third-group optical system G3 may consist of a joined lens W27 formed by joining the plano-concave lens L4 and the plano-convex lens L5, and the plano-concave lens L4 disposed on the objective optical system 2 side may be disposed such that the concave surface R6 faces the objective optical system 2. In this modification, the negative-power meniscus lens L7 of the fourth-group optical system G4 disposed on the imaging optical system 6 side may be disposed such that the concave surface R14 faces the imaging optical system 6.

In the above-described embodiment, the fifth-group optical system G5 consists of the positive-power biconvex lens L8. In this modification, the fifth-group optical system G5 may instead consist of a positive-power plano-convex single lens L28 (the focal length F5 is positive). In such a case, the plano-convex single lens L28 may be disposed such that the convex surface R16 faces the imaging optical system 6. In the above-described embodiment, the sixth-group optical system G6 consists of the single joined lens W9 formed by joining the biconcave lens L9, which is made of high-dispersion glass with a large refractive index, and the biconvex lens L10, which is made of low-dispersion glass with a small refractive index. Instead, the sixth-group optical system G6 may consist of a single joined lens W29 formed by joining a plano-concave lens L29 made of high-dispersion glass and the biconvex lens L10 made of low-dispersion glass. In such a case, the joining surface R18 of the joined lens W29 may have negative power.

It is desirable that Conditional Expressions (1) to (6) all be satisfied and that spherical aberration, field curvature, comatic aberration, and axial chromatic aberration be satisfactorily corrected. The configurations of the first-group optical system G1, the second-group optical system G2, and the fourth-group optical system G4 and Conditional Expressions (8) and (9) are the same as those according to the above-described embodiment. The variable-focus optical system 24 according to this modification has the lens data listed in Table 13.

TABLE 13

| S | R | d | nd | ν |
|---|---|---|---|---|
| 0 (Last surface of objective lens) | | 1 | | |
| 1 | 11.322 | 5 | 1.43875 | 94.93 |
| 2 | −11.322 | 1.88 | 1.6134 | 44.27 |
| 3 | ∞ | 1.12 | | |
| 4 | 5.373 | 2.7 | 1.43875 | 94.93 |
| 5 | 19.274 | 5.77 | | |
| 6 | −2.942 | 1.66 | 1.6134 | 44.27 |
| 7 | ∞ | 2.5 | 1.43875 | 94.93 |
| 8 | −5.23 | 2.0496 | | |
| 9 | ∞(Dummy surface) | *3-1 | | |
| 10 | ∞(Dummy surface) | 2.6529 | | |
| 11 | 12.678 | 2 | 1.48749 | 70.23 |
| 12 | −4.288 | 0.5 | | |
| 13 | 15.948 | 1.5 | 1.6134 | 44.27 |
| 14 | 4.002 | 14.57 | | |
| 15 | ∞ | 3 | 1.43875 | 94.93 |
| 16 | −10.9 | 0.5 | | |
| 17 | ∞ | 1.5 | 1.741 | 52.64 |
| 18 | 14.386 | 4.5 | 1.43875 | 94.93 |
| 19 | −17.061 | *3-2 | | |
| Imaging lens side | | | | |

FIGS. 19(a) to 19(d), 20(a), and 20(b) illustrate the aberrations when the front-group optical system 10 and the rear-group optical system 12 are in an afocal optical system relationship, i.e., when the inter-surface distances are d9=0 and d19=0. The magnification of the variable-focus optical system 24, the object side NA of the objective optical system 2, and the working distance of the objective optical system 2 (the value when the objective optical system 2, the variable-focus optical system 24, and the imaging optical system 6 are combined) when the inter-surface distances d9 and d19 change due to the rear-group optical system 12 moving in the optical axis direction are listed in Table 14. The parameters of the variable-focus optical system 24 are listed in Table 15. The values of Conditional Expressions (1) to (8) are listed in Table 16.

TABLE 14

| | | | | |
|---|---|---|---|---|
| Inter-surface distance of ninth surface d9 (*3-1) (mm) | 0.2 | 0 | −0.2 | −0.4 |
| Inter-surface distance of nineteenth surface d19 (*3-2) (mm) | −0.2 | 0 | 0.2 | 0.4 |
| Lateral magnification | −20.00 | −20.02 | −20.05 | −20.07 |
| NA | 0.498 | 0.503 | 0.510 | 0.516 |
| Working distance of objective optical system (*0) (mm) | 0.161 | 0.204 | 0.246 | 0.288 |

TABLE 15

| | |
|---|---|
| Fa | 22.55 |
| Fb | 22.57 |
| Ffa | −31.89 |
| Fbb | −16.96 |
| F1 | 50.09 |
| F2 | 16.03 |
| F3 | −13.12 |
| F4 | 14.00 |
| F5 | 24.84 |
| F6 | 156.33 |

TABLE 16

| | | |
|---|---|---|
| (1) ν1L − ν1H | | 50.66 |
| (2) \|F2/Fa\| | | 0.71 |
| (3) \|R3/Fa\| | | 0.13 |
| (4) \|R4/Fb\| | | 0.18 |
| (5) \|F5/Fb\| | | 1.10 |
| (6) ν6L − ν6H | | 42.29 |
| (7) Fa/F3 | | −1.72 |
| (8) Fb/F4 | | 1.61 |

By comparing the aberrations of the reference example microscope system that does not include a variable-focus optical system (FIGS. 7(a) to 7(d), 8(a), and 8(b)) and the aberrations of the microscope system 100 including the variable-focus optical system 24 according to this modification (FIGS. 19(a) to 19(d), 20(a), and 20(b)), it is clear that the changes in the spherical aberration, field curvature, comatic aberration, and axial chromatic aberration of the microscope system 100 including the variable-focus optical system 24 according to this modification are small, due to the presence of the variable-focus optical system 24.

In this modification, also, it is desirable to satisfy Conditional Expression (7). In this way, the front focal distance (Ffa) of the front-group optical system 10 is set to a negative value, and displacement of the back focus of the objective optical system 2 and the front focus of the front-group optical system 10 can be reduced. For example, the displacement is 3.9 mm. Accordingly, the displacement of the back focus of the objective optical system 2 and the front focus of the front-group optical system 10 can be reduced even more compared with the above-described embodiment and the first modification. In this way, when the rear-group optical system 12 is moved in the optical axis direction, the change in the magnification of the entire variable-focus optical system 24 can be reduced.

Figure 21:
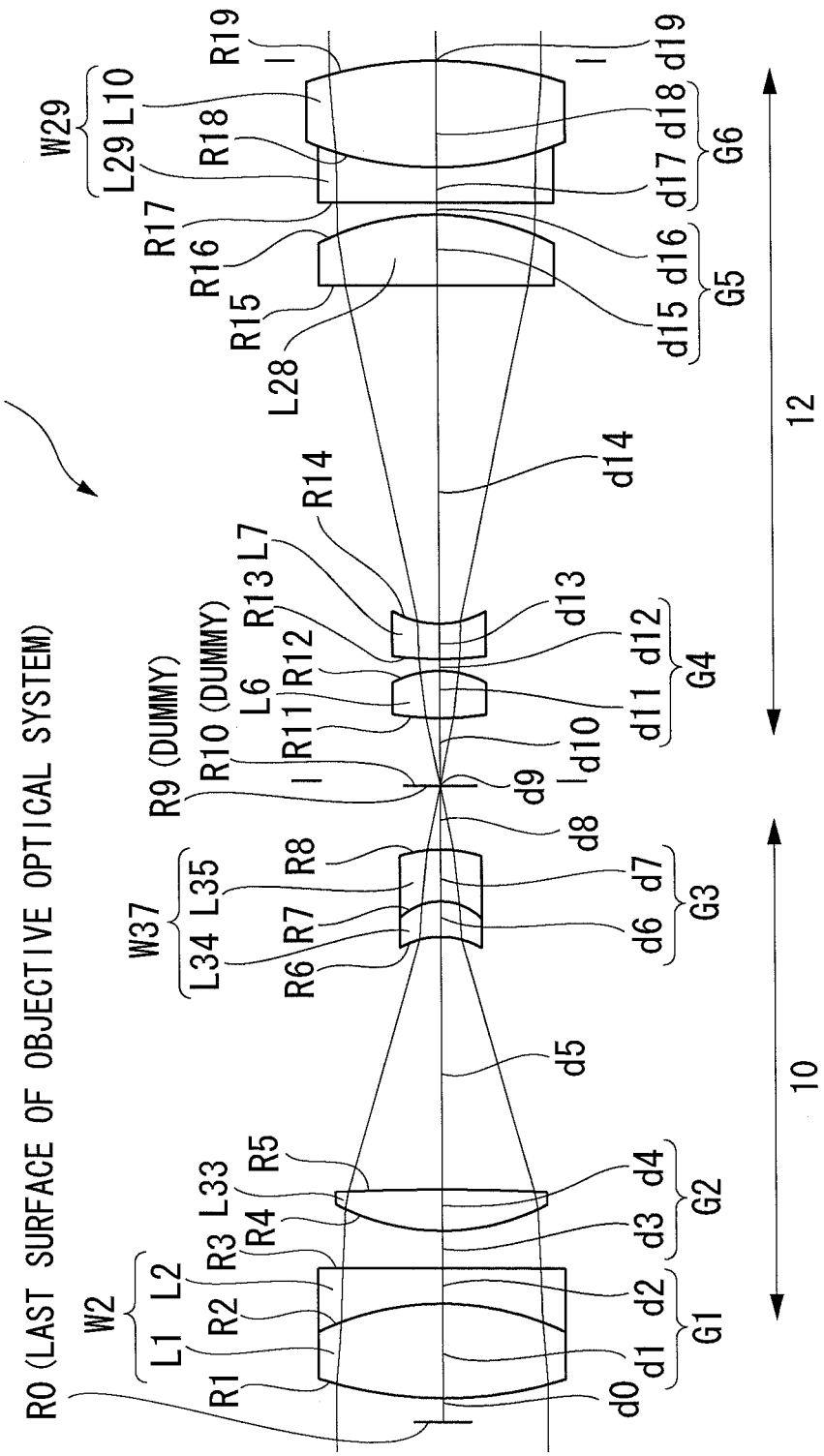
FIG. 21 is a sectional view of a variable-focus optical system according to a third modification of an embodiment of the present invention.
Figure 22:
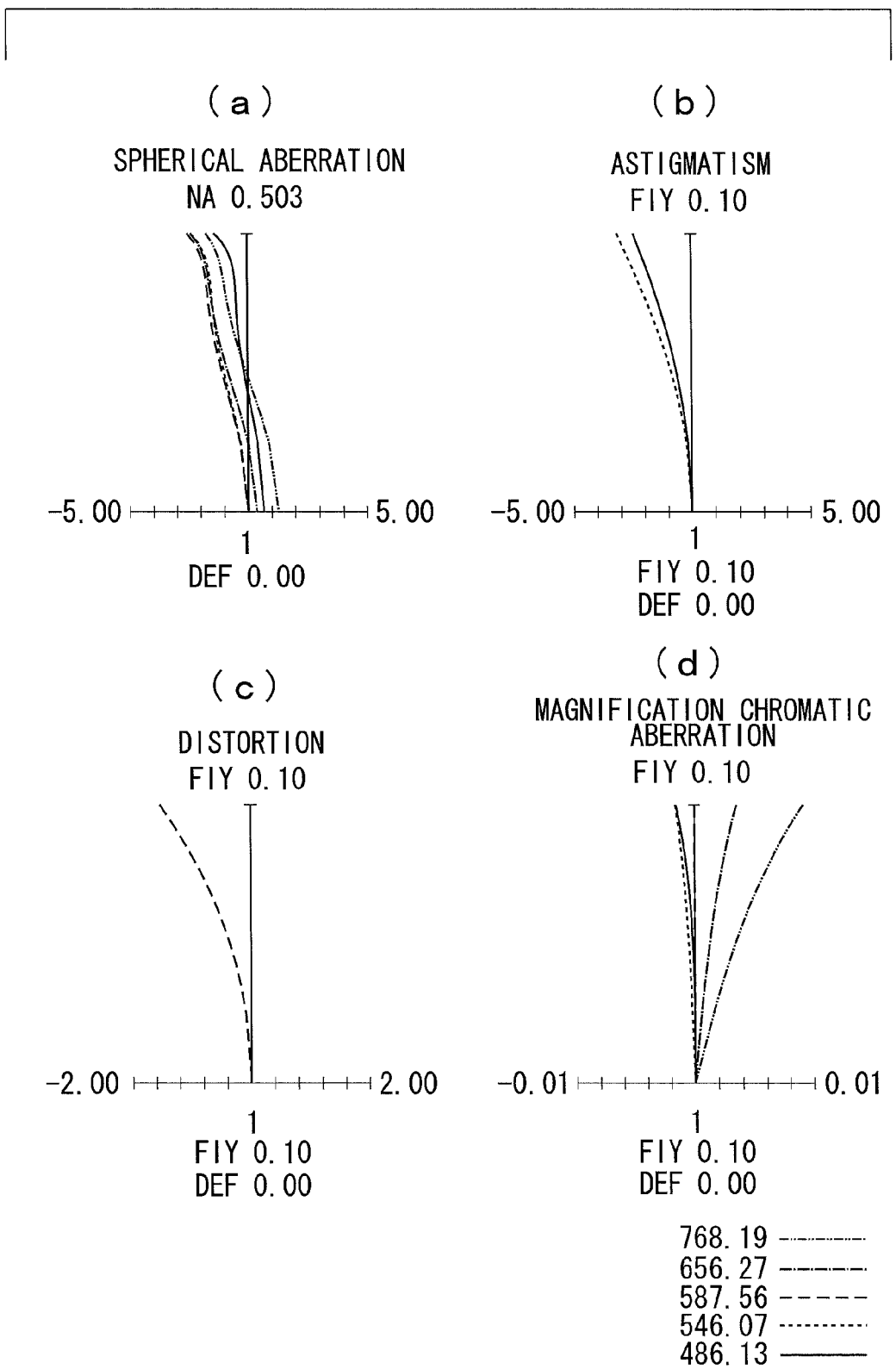
FIG. 22(a) illustrates the spherical aberration of a microscope system when a front-group optical system and a rear-group optical system of the variable-focus optical system in FIG. 21 are in an afocal optical system relationship.
FIG. 22(b) illustrates astigmatism of the same.
FIG. 22(c) illustrates distortion of the same.
FIG. 22(d) illustrates magnification chromatic aberration of the same.
Figure 23:
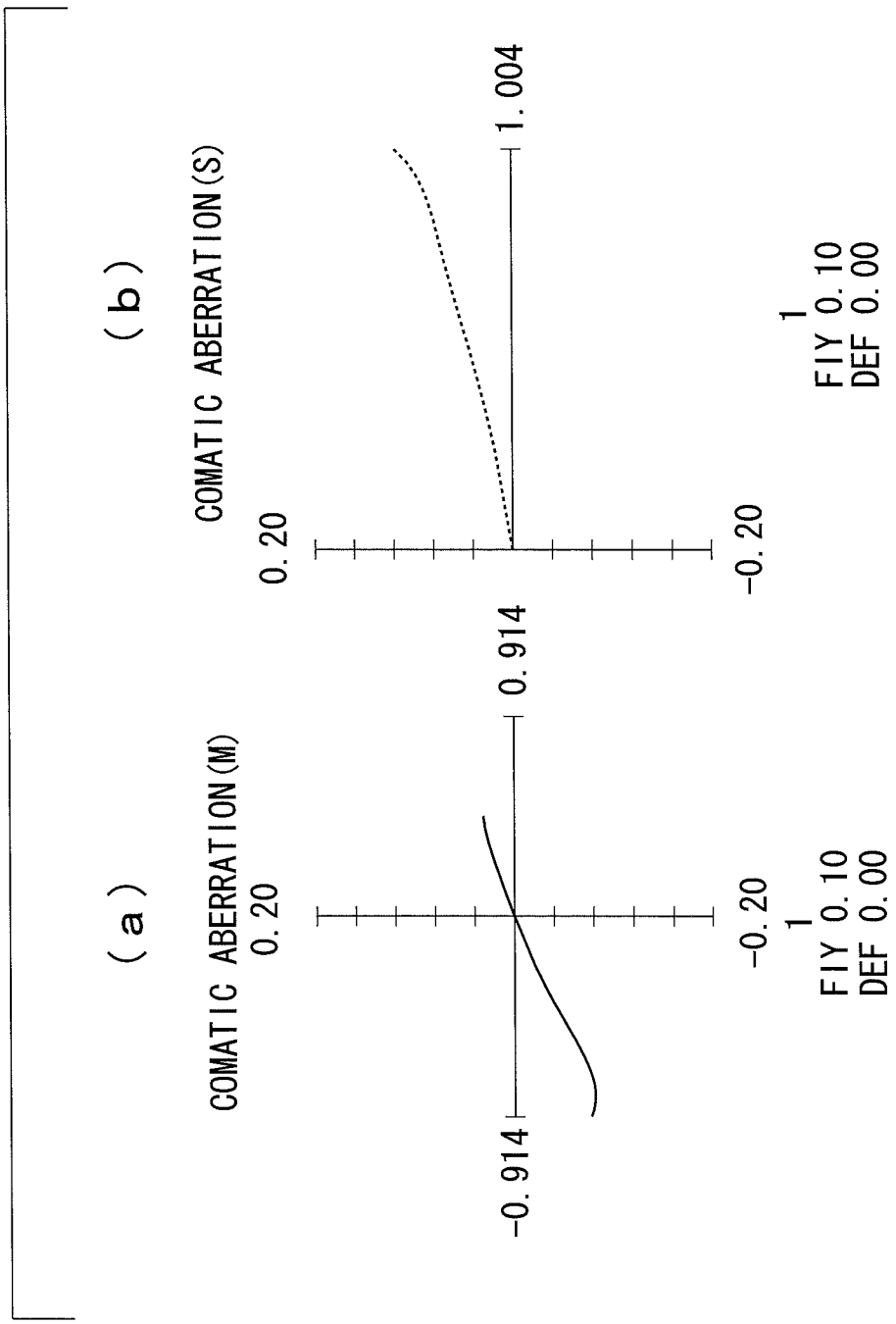
FIG. 23(a) illustrates the comatic aberration (M) when a front-group optical system and a rear-group optical system of the variable-focus optical system in FIG. 21 are in an afocal optical system relationship.
FIG. 23(b) illustrates the comatic aberration (S) of the same.

Next, as a variable-focus optical system 34 according to a third modification, for example, the second modification may be further modified as described below. That is, in the second modification, the second-group optical system G2 consists of the positive-power meniscus single lens L3. In this modification, however, as illustrated in FIG. 21, the second-group optical system G2 may consist of a positive-power biconvex single lens L33 (the focal length F2 is positive). In such a case, the biconvex single lens L33 is disposed with respect to the objective optical system 2 such that the convex surface R4 contacts the surface of the second-group optical system G2 closest to the objective optical system 2 and faces the objective optical system 2.

In the second modification, the third-group optical system G3 consists of two single lenses, that is, the plano-concave lens L4 and the plano-convex lens L5. In this modification, the third-group optical system G3 may instead consist of a joined lens W37 formed by joining a positive-power meniscus lens L34 and a negative-power meniscus lens L35. In such a case, the meniscus lens L34 may be disposed on the objective optical system 2 side such that the concave surface R6 faces the objective optical system 2.

It is desirable that Conditional Expressions (1) to (6) all be satisfied and that spherical aberration, field curvature, comatic aberration, and axial chromatic aberration be satisfactorily corrected. The configurations of the first-group optical system G1, the fourth-group optical system G4, the fifth-group optical system G5, and the sixth-group optical system G6, and Conditional Expressions (8) and (9) are the same as those according to the second modification. The variable-focus optical system 34 according to this modification has the lens data listed in Table 17.

TABLE 17

| S | R | d | nd | ν |
|---|---|---|---|---|
| 0 (Last surface of objective lens) | | 1 | | |
| 1 | 17.232 | 4 | 1.43875 | 94.93 |
| 2 | −12.183 | 1.5 | 1.6134 | 44.27 |
| 3 | ∞ | 1.59 | | |
| 4 | 9.535 | 1.75 | 1.43875 | 94.93 |
| 5 | −89.402 | 10.98 | | |
| 6 | −3.423 | 1.5 | 1.6134 | 44.27 |
| 7 | −2.484 | 2.2 | 1.43875 | 94.93 |
| 8 | −5.595 | 2.9064 | | |
| 9 | ∞(Dummy surface) | *4-1 | | |
| 10 | ∞(Dummy surface) | 2.6529 | | |
| 11 | 12.678 | 2 | 1.48749 | 70.23 |
| 12 | −4.288 | 0.5 | | |
| 13 | 15.948 | 1.5 | 1.6134 | 44.27 |
| 14 | 4.002 | 14.57 | | |
| 15 | ∞ | 3 | 1.43875 | 94.93 |
| 16 | −10.9 | 0.5 | | |
| 17 | ∞ | 1.5 | 1.741 | 52.64 |
| 18 | 14.386 | 4.5 | 1.43875 | 94.93 |
| 19 | −17.061 | *4-2 | | |
| Imaging lens side | | | | |

FIGS. 22(a) to 22(d), 23(a), and 23(b) illustrate the aberrations when the front-group optical system 10 and the rear-group optical system 12 are in an afocal optical system relationship, i.e., when the inter-surface distances are d9=0 and d19=0. The magnification of the variable-focus optical system 34, the object side NA of the objective optical system 2, and the working distance of the objective optical system 2 (the value when the objective optical system 2, the variable-focus optical system 34, and the imaging optical system 6 are combined) when the inter-surface distances d9 and d19 change due to the rear-group optical system 12 moving in the optical axis direction are listed in Table 18. The parameters of the variable-focus optical system 34 are listed in Table 19. The values of Conditional Expressions (1) to (8) are listed in Table 20.

TABLE 18

| | | | | |
|---|---|---|---|---|
| Inter-surface distance of ninth surface d9 (*4-1) (mm) | 0.2 | 0 | −0.2 | −0.4 |
| Inter-surface distance of nineteenth surface d19 (*4-2) (mm) | −0.2 | 0 | 0.2 | 0.4 |
| Lateral magnification | −19.83 | −20.01 | −20.20 | −20.39 |
| NA | 0.498 | 0.503 | 0.510 | 0.516 |
| Working distance of objective optical system (*0) (mm) | 0.161 | 0.204 | 0.246 | 0.287 |

TABLE 19

| | |
|---|---|
| Fa | 22.54 |
| Fb | 22.57 |
| Ffa | −10.87 |
| Fbb | −16.96 |
| F1 | 82.37 |
| F2 | 19.74 |
| F3 | 167.81 |
| F4 | 14.00 |
| F5 | 24.84 |
| F6 | 156.33 |

TABLE 20

| | |
|---|---|
| (1) ν1L − ν1H | 50.66 |
| (2) \|F2/Fa\| | 0.88 |
| (3) \|R3/Fa\| | 0.15 |
| (4) \|R4/Fb\| | 0.18 |
| (5) \|F5/Fb\| | 1.10 |
| (6) ν6L − ν6H | 42.29 |
| (7) Fa/F3 | 0.13 |
| (8) Fb/F4 | 1.61 |

By comparing the aberrations of the reference example microscope system that does not include a variable-focus optical system (FIGS. 7(a) to 7(d), 8(a), and 8(b)) and the aberrations of the microscope system 100 including the variable-focus optical system 34 according to this modification (FIGS. 22(a) to 22(d), 23(a), and 23(b)), it is clear that the changes in the spherical aberration, field curvature, comatic aberration, and axial chromatic aberration of the microscope system 100 including the variable-focus optical system 34 according to this modification are small, due to the presence of the variable-focus optical system 34.

In this modification, it is desirable to set the value of Conditional Expression (7) close to the upper limit. In this way, in comparison with the above-described embodiment and the modifications, the front focus of the front-group optical system 10 can be set at a position closer to the connecting part of the objective optical system 2 (for example, Ffa=−10.87). This is effective to reduce the change in magnification when in combination with the objective optical system 2, in which the back focus of the objective optical system 2 is at a position closer to the barrel.

Figure 24:
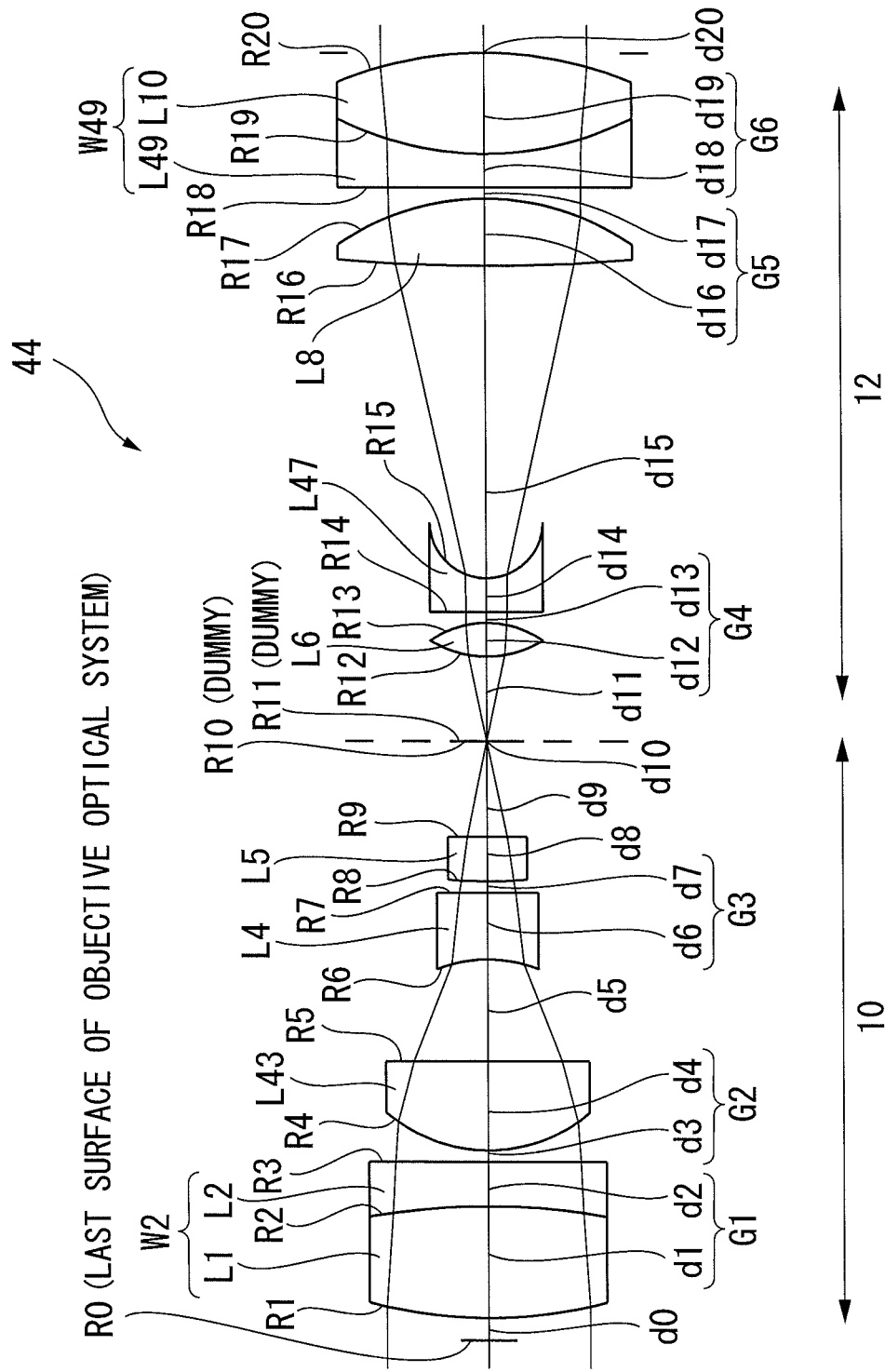
FIG. 24 is a sectional view of a variable-focus optical system according to a fourth modification of an embodiment of the present invention.
Figure 25:
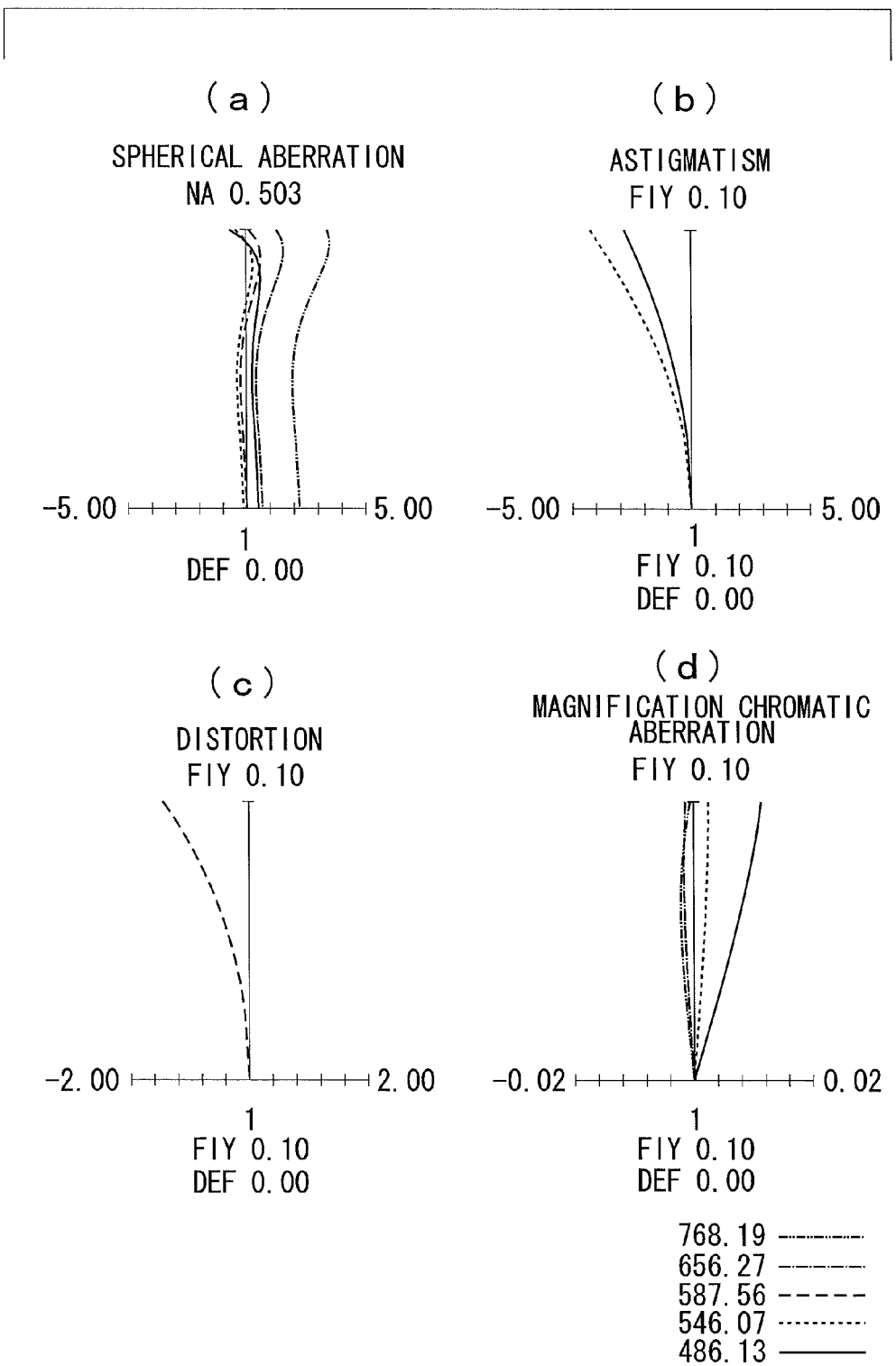
FIG. 25(a) illustrates the spherical aberration of a microscope system when a front-group optical system and a rear-group optical system of the variable-focus optical system in FIG. 24 are in an afocal optical system relationship.
FIG. 25(b) illustrates astigmatism of the same.
FIG. 25(c) illustrates distortion of the same.
FIG. 25(d) illustrates magnification chromatic aberration of the same.
Figure 26:
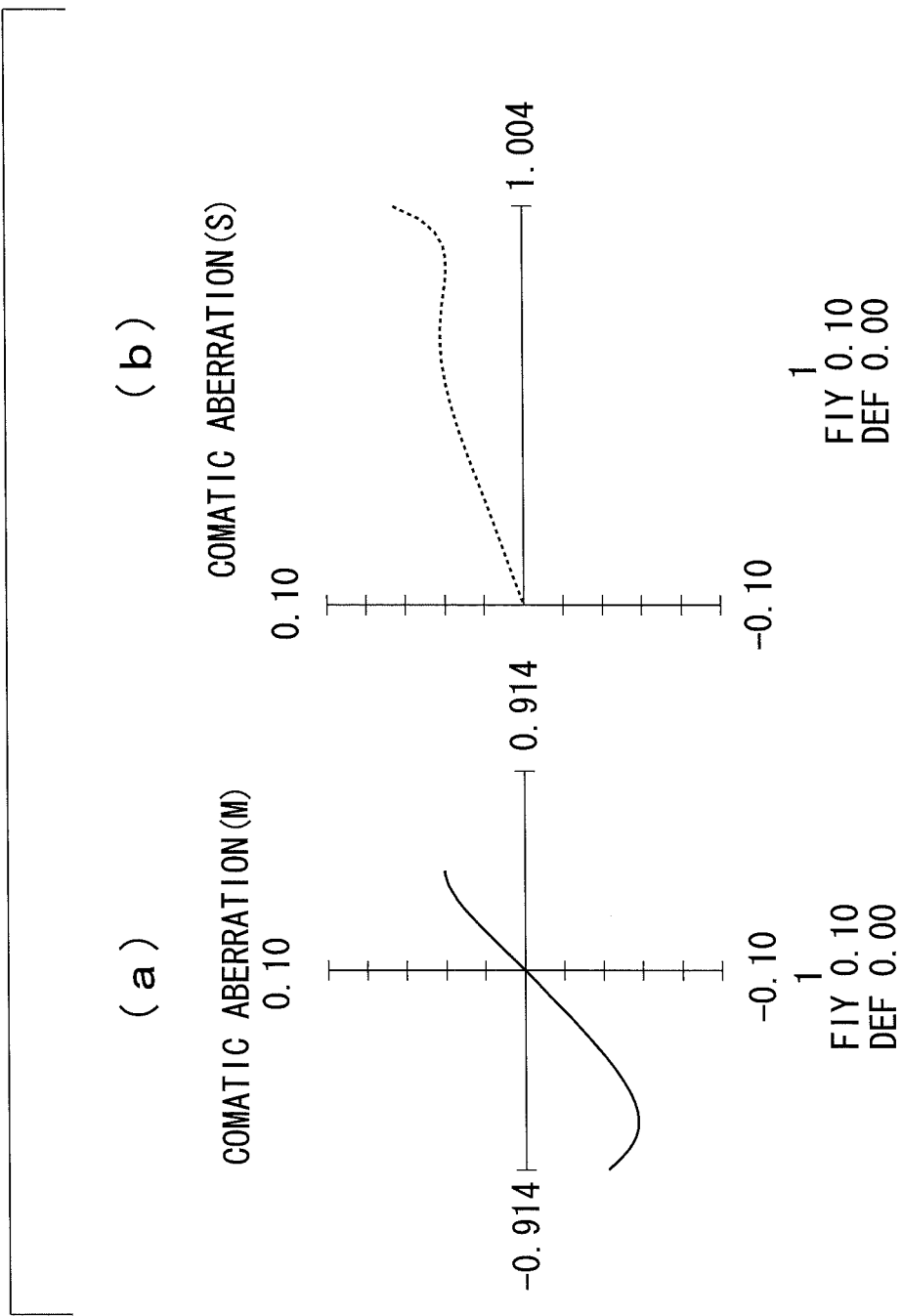
FIG. 26(a) illustrates the comatic aberration (M) of a microscope system when a front-group optical system and a rear-group optical system of the variable-focus optical system in FIG. 24 are in an afocal optical system relationship.
FIG. 26(b) illustrates the comatic aberration (S) of the same.

Next, as a variable-focus optical system 44 according to a fourth modification, for example, the above-described embodiment may be further modified as described below. That is, in the above-described embodiment, the second-group optical system G2 consists of the meniscus single lens L3. In this modification, however, as illustrated in FIG. 24, the second-group optical system G2 may consist of a positive-power biconvex single lens L43 (the focal length F2 is positive). In such a case, the biconvex single lens L43 is disposed with respect to the objective optical system 2 such that the convex surface R4 contacts the surface of the second group closest to the objective optical system 2 and faces the objective optical system 2.

In the above-described embodiment, the fourth-group optical system G4 consists of two single lenses, that is, the biconvex lens L6 and the negative-power meniscus lens L7. In this modification, the fourth-group optical system G4 may consist of two single lenses, that is, the biconvex lens L6 and a plano-concave lens L47. In such a case, the entire fourth-group optical system G4 may have positive power (the focal length F4 is positive), and a plano-concave lens L7 may be disposed on the imaging optical system 6 side such that the concave surface R15 faces the imaging optical system 6.

In the above-described embodiment, the sixth-group optical system G6 consists of a single joined lens W9 formed by joining the biconcave lens L9 and the biconvex lens L10. In this modification, the sixth-group optical system G6 may consist of a single joined lens W49 formed by joining a plano-concave lens L49 made of high-dispersion glass with a large refractive index and a biconvex lens L10 made of low-dispersion glass with a small refractive index. In such a case, the entire sixth-group optical system G6 may have positive power (the focal length F6 is positive), and the joining surface R19 of the joined lens W49 may have negative power.

It is desirable that Conditional Expressions (1) to (6) all be satisfied and that spherical aberration, field curvature, comatic aberration, and axial chromatic aberration be satisfactorily corrected. The configurations of the first-group optical system G1, the third-group optical system G3, and the fifth-group optical system G5 and Conditional Expressions (7), (8), and (9) are the same as those according to the above-described embodiment. The variable-focus optical system 44 according to this modification has the lens data listed in Table 21.

TABLE 21

| S | R | d | nd | ν |
|---|---|---|---|---|
| 0 (Last surface of objective lens) | | 1 | | |
| 1 | 20.453 | 5 | 1.43875 | 94.93 |
| 2 | −29.5666 | 2 | 1.61405 | 54.99 |
| 3 | ∞ | 0.5 | | |
| 4 | 6.8227 | 4 | 1.43875 | 94.93 |
| 5 | −412.3964 | 4.54 | | |
| 6 | −6 | 3 | 1.6134 | 44.27 |
| 7 | ∞ | 0.5 | | |
| 8 | 18.3412 | 2 | 1.43875 | 94.93 |
| 9 | ∞ | 4.5645 | | |
| 10 | ∞(Dummy surface) | *5-1 | | |
| 11 | ∞(Dummy surface) | 3.5033 | | |
| 12 | 4.6763 | 1.5 | 1.48749 | 70.23 |
| 13 | −4.2963 | 0.5 | | |
| 14 | ∞ | 1.5 | 1.48749 | 70.23 |
| 15 | 2.5 | 13.968 | | |
| 16 | 77.403 | 3 | 1.43875 | 94.93 |
| 17 | −11.28 | 0.5 | | |
| 18 | ∞ | 1.5 | 1.762 | 40.1 |
| 19 | 14.187 | 4.5 | 1.43875 | 94.93 |
| 20 | −16.8429 | *5-2 | | |
| Imaging lens side | | | | |

FIGS. 25(a) to 25(d), 26(a), and 26(b) illustrate the aberrations when the front-group optical system 10 and the rear-group optical system 12 are in an afocal optical system relationship, i.e., when d10=0 and d20=0. The magnification of the variable-focus optical system 44, the object side NA of the objective optical system 2, and the working distance of the objective optical system 2 (the value when the objective optical system 2, the variable-focus optical system 44, and the imaging optical system 6 are combined) when the inter-surface distances d10 and d20 change due to the rear-group optical system 12 moving in the optical axis direction are listed in Table 22. The parameters of the variable-focus optical system 44 are listed in Table 23. The values of Conditional Expressions (1) to (8) are listed in Table 24.

TABLE 22

| | | | | |
|---|---|---|---|---|
| Inter-surface distance of tenth surface d10 (*5-1) (mm) | 0.2 | 0 | −0.2 | −0.4 |
| Inter-surface distance of twentieth surface d20 (*5-2) (mm) | −0.2 | 0 | 0.2 | 0.4 |
| Lateral magnification | −19.97 | −19.97 | −20.00 | −20.03 |
| NA | 0.498 | 0.503 | 0.510 | 0.516 |
| Working distance of objective optical system (*0) (mm) | 0.161 | 0.204 | 0.246 | 0.289 |

TABLE 23

| | |
|---|---|
| Fa | 22.48 |
| Fb | 22.56 |
| Ffa | −30.98 |

TABLE 23-continued

| | |
|---|---|
| Fbb | −26.82 |
| F1 | 62.64 |
| F2 | 15.34 |
| F3 | −13.79 |
| F4 | 10.89 |
| F5 | 22.67 |
| F6 | 195.28 |

TABLE 24

| | |
|---|---|
| (1) ν1L − ν1H | 39.94 |
| (2) \|F2/Fa\| | 0.68 |
| (3) \|R3/Fa\| | 0.27 |
| (4) \|R4/Fb\| | 0.11 |
| (5) \|F5/Fb\| | 1.01 |
| (6) ν6L − ν6H | 54.83 |
| (7) Fa/F3 | −1.63 |
| (8) Fb/F4 | 2.07 |

By comparing the aberrations of the reference example microscope system that does not include a variable-focus optical system (FIGS. 7(a) to 7(d), 8(a), and 8(b)) and the aberrations of the microscope system 100 including the variable-focus optical system 44 according to this modification (FIGS. 25(a) to 25(d), 26(a), and 26(b)), it is clear that the changes in the spherical aberration, field curvature, comatic aberration, and axial chromatic aberration of the microscope system 100 including the variable-focus optical system 44 according to this modification are small, due to the presence of the variable-focus optical system 44.

Figure 27:
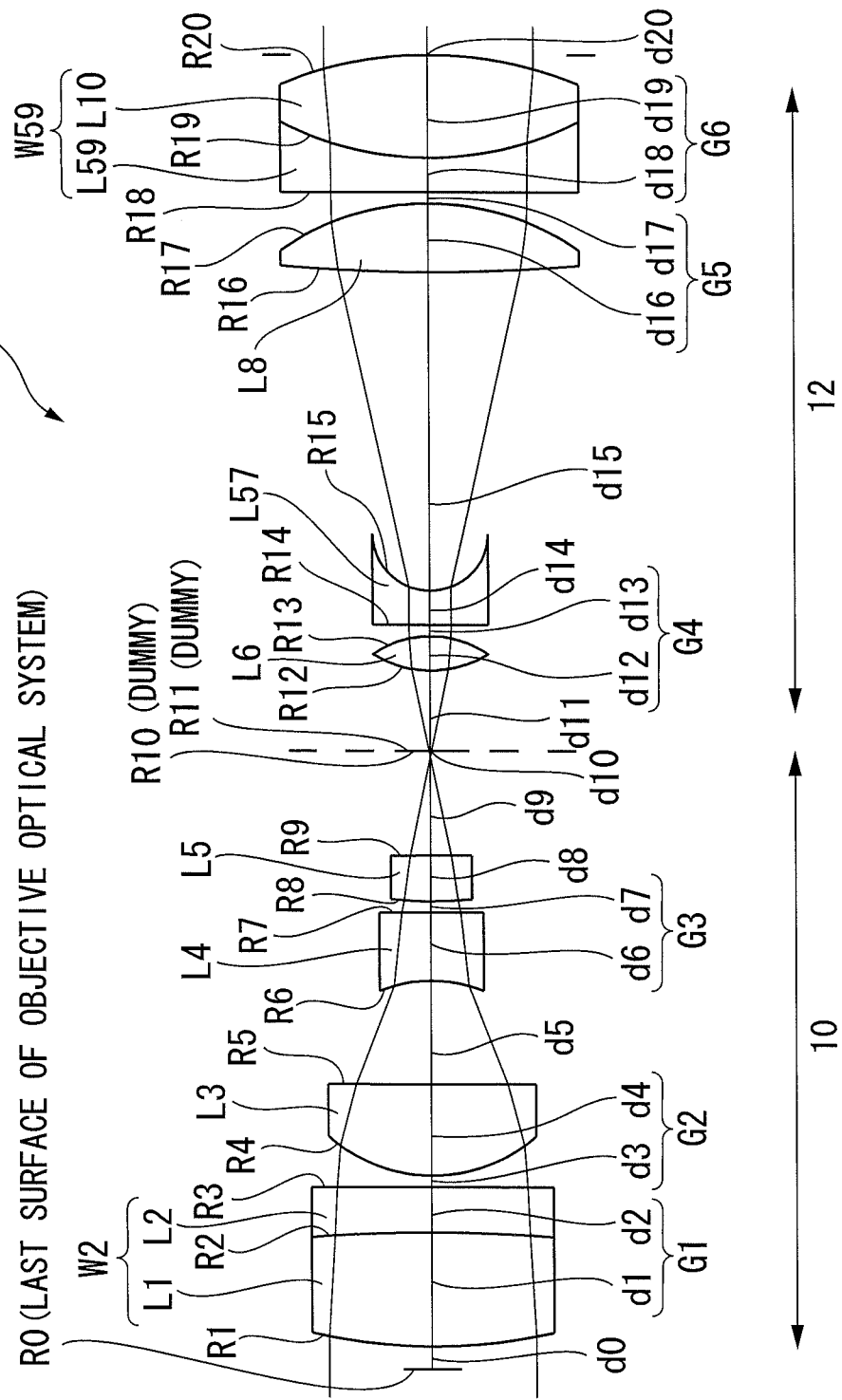
FIG. 27 is a sectional view of a variable-focus optical system according to a fifth modification of an embodiment of the present invention.

Next, as a variable-focus optical system 54 according to a fifth modification, for example, the above-described embodiment may be further modified as described below. That is, in the above-described embodiment, the fourth-group optical system G4 consists of two single lenses, that is, the biconvex lens L6 and the negative-power meniscus lens L7. In this modification, as illustrated in FIG. 27, the fourth-group optical system G4 may consist of two single lenses, that is, the biconvex lens L6 and a plano-concave lens L57. In such a case, the entire fourth-group optical system G4 may have positive power (the focal length F4 is positive), and the plano-concave lens L7 may be disposed on the imaging optical system 6 side such that the concave surface R15 faces the imaging optical system 6.

In the above-described embodiment, although the sixth-group optical system G6 consists of the single joined lens W9 formed by joining the biconcave lens L9 and the biconvex lens L10, this modification may consist of a single joined lens W59 formed by joining a plano-concave lens L59 made of high-dispersion glass with a large refractive index and a biconvex lens L10 made of low-dispersion glass with a small refractive index. In such a case, the entire sixth-group optical system G6 may have positive power (the focal length F6 is positive), and the joining surface R19 of the joined lens W59 may have negative power.

It is desirable that Conditional Expressions (1) to (6) be satisfied and that spherical aberration, field curvature, comatic aberration, and axial chromatic aberration be satisfactorily corrected. The first-group optical-system G1 to third-group optical system G3, the fifth-group optical system G5, and the sixth-group optical system G6 and Conditional Expressions (7), (8), and (9) are the same as those according to the above-described embodiment. The variable-focus optical system 54 according to this modification has the lens data listed in Table 25.

TABLE 25

| S | R | d | nd | ν |
|---|---|---|---|---|
| 0 (Last surface of objective lens) | | 1 | | |
| 1 | 23.252 | 5 | 1.43875 | 94.93 |
| 2 | −67.6024 | 2 | 1.62004 | 36.26 |
| 3 | ∞ | 0.5 | | |
| 4 | 6.7402 | 4 | 1.43875 | 94.93 |
| 5 | 461.0789 | 4.54 | | |
| 6 | −6 | 3 | 1.6134 | 44.27 |
| 7 | ∞ | 0.5 | | |
| 8 | 18.4681 | 2 | 1.43875 | 94.93 |
| 9 | ∞ | 4.6249 | | |
| 10 | ∞(Dummy surface) | *6-1 | | |
| 11 | ∞(Dummy surface) | 3.5033 | | |
| 12 | 4.6763 | 1.5 | 1.48749 | 70.23 |
| 13 | −4.2963 | 0.5 | | |
| 14 | ∞ | 1.5 | 1.48749 | 70.23 |
| 15 | 2.5 | 13.968 | | |
| 16 | 77.403 | 3 | 1.43875 | 94.93 |
| 17 | −11.28 | 0.5 | | |
| 18 | ∞ | 1.5 | 1.762 | 40.1 |
| 19 | 14.187 | 4.5 | 1.43875 | 94.93 |
| 20 | −16.8429 | *6-2 | | |
| Imaging lens side | | | | |

FIGS. 28(a) to 28(d), 29(a), and 29(b) illustrate the aberrations when the front-group optical system 10 and the rear-group optical system 12 are in an afocal optical system relationship, i.e., when d10=0 and d20=0. The magnification of the variable-focus optical system 54, the object side NA of the objective optical system 2, and the working distance of the objective optical system 2 (the value when the objective optical system 2, the variable-focus optical system 54, and the imaging optical system 6 are combined) when the inter-surface distances d10 and d20 change due to the rear-group optical system 12 moving in the optical axis direction are listed in Table 26. The parameters of the variable-focus optical system 54 are listed in Table 27. The values of Conditional Expressions (1) to (8) are listed in Table 28.

TABLE 26

| | | | | |
|---|---|---|---|---|
| Inter-surface distance of tenth surface d10 (*6-1) (mm) | 0.2 | 0 | −0.2 | −0.4 |
| Inter-surface distance of twentieth surface d20 (*6-2) (mm) | −0.2 | 0 | 0.2 | 0.4 |
| Lateral magnification | −19.94 | −19.98 | −20.01 | −20.04 |
| NA | 0.498 | 0.504 | 0.510 | 0.516 |
| Working distance of objective optical system (*0) (mm) | 0.161 | 0.204 | 0.247 | 0.289 |

TABLE 27

| | |
|---|---|
| Fa | 22.48 |
| Fb | 22.56 |
| Ffa | −30.95 |
| Fbb | −26.82 |
| F1 | 61.11 |
| F2 | 15.55 |
| F3 | −13.75 |
| F4 | 10.89 |
| F5 | 22.67 |
| F6 | 195.28 |

TABLE 28

| | |
|---|---|
| (1) ν1L − ν1H | 58.67 |
| (2) \|F2/Fa\| | 0.69 |
| (3) \|R3/Fa\| | 0.27 |
| (4) \|R4/Fb\| | 0.11 |
| (5) \|F5/Fb\| | 1.01 |
| (6) ν6L − ν6H | 54.83 |
| (7) Fa/F3 | −1.64 |
| (8) Fb/F4 | 2.07 |

By comparing the aberrations of the reference example microscope system that does not include a variable-focus optical system (FIGS. 7(a) to 7(d), 8(a), and 8(b)) and the aberrations of the microscope system 100 including the variable-focus optical system 54 according to this modification (FIGS. 28(a) to 28(d), 29(a), and 29(b)), it is clear that the changes in the spherical aberration, field curvature, comatic aberration, and axial chromatic aberration of the microscope system 100 including the variable-focus optical system 54 according to this modification are small, due to the presence of the variable-focus optical system 54.

Details of the embodiments of the present invention have been described with reference to drawings. The detailed configuration is not limited to the embodiment and may include design changes, etc. without departing from the scope of the invention. For example, in the above-described embodiment and the modifications thereof, the rear-group optical system is moved. Instead, at least one of the front-group optical system 10 and the rear-group optical system 12 may be moved in the optical axis direction with the optical-system driving unit; thus, the front-group optical system 10 may be moved or both the front-group optical system 10 and the rear-group optical system 12 may be moved.

The focus optical systems 4, 14, 24, 34, 44, and 54 according to the above-described embodiment and the modifications are not limited to use in microscopes for examining a specimen S (various biological specimens) on a stage and microscopes for examining microscope slides but may be used in various microscope apparatuses having a microscopic examination function for directly examining biological samples.

{Reference Signs List}

| | |
|---|---|
| 2 | objective optical system |
| 4, 14, 24, 34, 44, 54 | focus optical system |
| 6 | imaging optical system |
| 10 | front-group optical system |
| 12 | rear-group optical system |
| G1 | first-group optical system |
| G2 | second-group optical system |
| G3 | third-group optical system |
| G4 | fourth-group optical system |
| G5 | fifth-group optical system |
| G6 | sixth-group optical system |
| 100 | microscope system |
| S | specimen |

The invention claimed is:

1. A variable-focus optical system that is used in a microscope system including an objective optical system configured to convert light coming from a specimen to a substantially collimated beam and an imaging optical system configured to image, at a predetermined position, the light converted to the substantially collimated beam by the objective optical system, that is disposed between the objective optical system and the imaging optical system, and that varies a working distance of the objective optical system, the variable-focus optical system comprising:

a front-group optical system having positive power on the whole and a rear-group optical system having positive power substantially the same as that of the front-group optical system on the whole, the optical systems being disposed in this order from the objective optical system side, an optical-system driving unit configured to drive at least one of the front-group optical system and the rear-group optical system in an optical axis direction to relatively change the distance between the front-group optical system and the rear-group optical system in the optical axis direction, wherein the front-group optical system consists of, in order from the objective optical system side, a first-group optical system having positive power on the whole, a second-group optical system having positive power on the whole, and a third-group optical system, the first-group optical system consists of a single joined lens formed by joining, at a joining surface having negative power, a lens made of a low-dispersion material with a small refractive index and a lens made of a high-dispersion material with a large refractive index, the second-group optical system consists of a positive-power lens disposed closest to the objective optical system such that a convex surface faces the objective optical system, the third-group optical system consists of two lenses, of which the lens disposed closest to the objective optical system has a concave surface facing the objective optical system, the rear-group optical system consists of, in order from the objective optical system side, a fourth-group optical system having positive power on the whole, a fifth-group optical system, and a sixth-group optical system having positive power on the whole, the fourth-group optical system consists of, in this order from the objective optical system side, two lenses, that is, a positive-power lens and a negative-power lens disposed such that the negative-power lens disposed closest to the imaging optical system has a concave surface facing the imaging optical system, the fifth-group optical system consists of a positive-power lens disposed closest to the imaging optical system such that a convex surface facing the imaging optical system, and the sixth-group optical system consists of a single joined lens formed by joining, at a joining surface having negative power, a lens made of a low-dispersion material with a small refractive index and a lens made of a high-dispersion material with a large refractive index.

2. The variable-focus optical system according to claim 1, wherein the following Conditional Expressions (1) to (6) are satisfied:

$$35 < \nu_{1L} - \nu_{1H} < 60 \qquad (1)$$

$$0.6 < |F2/Fa| < 0.9 \qquad (2)$$

$$0.1 < |R_{G3}/Fa| < 0.3 \qquad (3)$$

$$0.1 < |R_{G4}/Fb| < 0.2 \qquad (4)$$

$$0.9 < |F5/Fb| < 1.2 \qquad (5)$$

$$40 < \nu_{6L} - \nu_{6H} < 60 \qquad (6)$$

where $\nu_{1L}$ represents the d-line Abbe number of the lens of the joined lens in the first-group optical system made of a low-dispersion material with a small refractive index, $\nu_{1H}$ represents the d-line Abbe number of the lens of the joined lens in the first-group optical system made of a high-dispersion material with a large refractive index, Fa represents the focal length of the entire front-group optical system, Fb represents the focal length of the entire rear-group optical system, F2 represents the focal length of the second-group optical system, $R_{G3}$ represents the radius of curvature of the concave surface of the lens disposed closest to the objective optical system in the third-group optical system, $R_{G4}$ represents the radius of curvature of the concave surface of the negative-power lens disposed closest to the imaging optical system in the fourth-group optical system, F5 represents the focal length of the fifth-group optical system, $\nu_{6L}$ represents the d-line Abbe number of the lens of the joined lens in the sixth-group optical system made of a low-dispersion material with a small refractive index, and $\nu_{6H}$ represents the d-line Abbe number of the lens of the joined lens in the sixth-group optical system made of a high-dispersion material with a large refractive index.

3. The variable-focus optical system according to claim 2, wherein a value of the front focus position of the front-group optical system and a value of the rear focus position of the rear-group optical system are both negative.

4. The variable-focus optical system according to claim 3, wherein the following Conditional Expressions (7) and (8) are satisfied:

$$-1.8 < Fa/F3 < 0.2 \tag{7}$$

$$1.5 < Fb/F4 < 2.2 \tag{8}$$

where F3 represents the focal length of the third-group optical system, and F4 represents the focal length of the fourth-group optical system.

5. The variable-focus optical system according to claim 2, wherein the following Conditional Expression (9) is satisfied:

$$0.1 < Fa/Ft1 < 0.2 \tag{9}$$

where Ft1 represents the focal length of the imaging optical system.

* * * * *